United States Patent
Ishishita

(10) Patent No.: US 8,306,692 B2
(45) Date of Patent: Nov. 6, 2012

(54) INPUT/OUTPUT CONTROL DEVICE FOR SECONDARY BATTERY AND VEHICLE

(75) Inventor: Teruo Ishishita, Aichi-ken (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 649 days.

(21) Appl. No.: 12/524,802

(22) PCT Filed: Mar. 5, 2008

(86) PCT No.: PCT/JP2008/054436
§ 371 (c)(1),
(2), (4) Date: Jul. 28, 2009

(87) PCT Pub. No.: WO2008/111593
PCT Pub. Date: Sep. 18, 2008

(65) Prior Publication Data
US 2010/0070133 A1    Mar. 18, 2010

(30) Foreign Application Priority Data

Mar. 6, 2007    (JP) ................................. 2007-055992

(51) Int. Cl.
*H02J 7/00*    (2006.01)
(52) U.S. Cl. .......... 701/36; 320/119; 320/123; 320/133; 320/134; 320/136; 320/156; 320/157; 180/54.1; 180/65.1; 180/65.21; 180/65.285; 180/65.31; 318/139; 318/140; 701/99; 903/902; 903/903; 903/904; 903/905; 903/906; 903/907
(58) Field of Classification Search .................. None
See application file for complete search history.

(56) References Cited

U.S. PATENT DOCUMENTS

| 4,990,885 | A | * | 2/1991 | Irick et al. ..................... 340/455 |
| 5,334,926 | A | * | 8/1994 | Imaizumi ...................... 320/104 |
| 5,798,629 | A | * | 8/1998 | Terauchi ....................... 320/106 |
| 5,929,602 | A | * | 7/1999 | Suzuki .......................... 320/116 |
| 6,005,297 | A | * | 12/1999 | Sasaki et al. .................. 290/4 C |
| 6,091,228 | A | * | 7/2000 | Chady et al. .................. 320/132 |
| 6,107,779 | A | * | 8/2000 | Hara et al. .................... 320/132 |
| 6,238,016 | B1 | * | 5/2001 | Soga ........................ 303/122.04 |
| 6,271,645 | B1 | * | 8/2001 | Schneider et al. ............ 320/118 |
| 6,304,059 | B1 | * | 10/2001 | Chalasani et al. ............ 320/118 |
| 6,329,791 | B1 | * | 12/2001 | Yokoyama et al. ........... 320/127 |
| 6,384,489 | B1 | * | 5/2002 | Bluemel et al. .............. 307/10.1 |
| 6,522,960 | B2 | * | 2/2003 | Nada ............................... 701/22 |

(Continued)

FOREIGN PATENT DOCUMENTS

JP    9-308117 A    11/1997

(Continued)

*Primary Examiner* — Jonathan M Dager
(74) *Attorney, Agent, or Firm* — Sughrue Mion, PLLC

(57) ABSTRACT

An input/output control device for a secondary battery mounted on a vehicle includes a current estimating unit estimating a battery current input to or output from the secondary battery based on an input/output power of the secondary battery and outputting an estimated value (estimated current (Is)), a current sensor measuring the battery current and outputting a measured value (measured current (It)), and an input/output control unit controlling the input/output power based on the estimated value and the measured value. The input/output control device controls the input/output of the secondary battery, using the measured current (It) as well as the estimated value (Is), and therefore can suppress more reliably significant increase in heating value of the secondary battery and its peripheral parts.

8 Claims, 17 Drawing Sheets

U.S. PATENT DOCUMENTS

| | | | |
|---|---|---|---|
| 6,573,688 B2* | 6/2003 | Nakanishi | 320/135 |
| 6,580,180 B2* | 6/2003 | Tamai et al. | 307/10.1 |
| 6,583,602 B2* | 6/2003 | Imai et al. | 320/118 |
| 7,061,138 B2* | 6/2006 | Richter et al. | 307/10.7 |
| 7,200,499 B2* | 4/2007 | Aridome | 702/64 |
| 7,336,055 B2* | 2/2008 | Ishishita | 320/150 |
| 7,613,577 B2* | 11/2009 | Yamaji et al. | 702/63 |
| 2002/0108794 A1* | 8/2002 | Wakashiro et al. | 180/65.2 |
| 2002/0167291 A1* | 11/2002 | Imai et al. | 320/119 |
| 2002/0195999 A1* | 12/2002 | Kimura et al. | 320/134 |
| 2003/0001544 A1* | 1/2003 | Nakanishi | 320/162 |
| 2003/0030414 A1* | 2/2003 | Suzuki | 320/136 |
| 2003/0094816 A1* | 5/2003 | Kazama | 290/40 C |
| 2004/0076860 A1* | 4/2004 | Aso | 429/23 |
| 2004/0138836 A1* | 7/2004 | Ishishita et al. | 702/63 |
| 2005/0083017 A1 | 4/2005 | Suzuki | |
| 2006/0181245 A1* | 8/2006 | Mizuno et al. | 320/132 |
| 2006/0197346 A1* | 9/2006 | Maehara | 290/40 B |
| 2007/0013347 A1* | 1/2007 | Kamohara | 320/160 |
| 2007/0145950 A1* | 6/2007 | Wang | 320/134 |
| 2007/0239374 A1* | 10/2007 | Dougherty et al. | 702/63 |
| 2008/0177444 A1* | 7/2008 | Tachibana et al. | 701/41 |
| 2009/0051321 A1* | 2/2009 | Sato | 320/132 |
| 2009/0261836 A1* | 10/2009 | Murakami et al. | 324/429 |

FOREIGN PATENT DOCUMENTS

| | | |
|---|---|---|
| JP | 2004-104876 A | 4/2004 |
| JP | 2005-124353 A | 5/2005 |
| JP | 2006-20401 A | 1/2006 |
| JP | 2006-149181 A | 6/2006 |
| JP | 2006-170943 A | 6/2006 |

* cited by examiner

US 8,306,692 B2

INPUT/OUTPUT CONTROL DEVICE FOR SECONDARY BATTERY AND VEHICLE

TECHNICAL FIELD

The present invention relates to an input/output control device for a secondary battery as well as a vehicle. Particularly, the invention relates to an input/output control device that can suppress increase in heating value of a secondary battery as well as a vehicle equipped with the input/output control device.

BACKGROUND ART

In recent years, attention has been given to hybrid vehicles and electric vehicles against the background of environmental issues. These vehicles are equipped with an electric motor as a drive power source, and are also equipped with, e.g., a secondary battery as its electric power source. Since overdischarge and overcharge of the secondary battery lower performance of the secondary battery, it is necessary to control appropriately the charge/discharge of the secondary battery.

Japanese Patent Laying-Open No. 2006-149181 has disclosed a current control device that can prevent sudden voltage lowering in a battery. This current control device includes current sensing means for sensing a current discharged from the battery, and control means for controlling the current discharged from the battery based on a current value obtained by the current sensing means. The control means squares the current value obtained by the sensing means, and further integrates the square value on a time series to obtain a current square integrated value. Further, the control means limits the currents discharged from the battery, based on the current square integrated value. By limiting the current discharged from the battery based on the current square integrated value, it is possible to limit the discharge current value before the battery voltage lowers suddenly. In this manner, the sudden voltage lowering can be prevented when a large current is discharged.

In the current control device disclosed in Japanese Patent Laying-Open No. 2006-149181, when a failure occurs in the current sensing means, a correct current value cannot be obtained. When the charge/discharge control of the battery is performed based on an incorrect current value, it may be impossible to take out a desired power from the battery, or the battery may be overdischarged. However, Japanese Patent Laying-Open No. 2006-149181 has not disclosed a possibility of occurrence of these problems.

DISCLOSURE OF THE INVENTION

An object of the invention is to provide an input/output control device that can protect a secondary battery more reliably as well as a vehicle equipped with the input/output control device.

In summary, the invention provides an input/output control device of a secondary battery including an estimating unit for estimating a battery current input to or output from the secondary battery based on an input/output power of the secondary battery to output an estimated value; a current measuring unit for measuring the battery current to output a measured value; and a control unit for controlling the input/output power based on the estimated value and the measured value.

Preferably, the control unit calculates a first value obtained by performing time-based smoothing on a square of the estimated value and a second value obtained by performing time-based smoothing on a square of the measured value, and controls the input/output power based on a result of a comparison of larger one of the first and second values with a threshold.

More preferably, when the control unit determines that the larger one of the first and second values exceeds the threshold, the control unit limits the input/output power.

Further preferably, the input/output control device further includes a temperature sensing unit for sensing a battery temperature of the secondary battery. The control unit changes the limit value of the input/output power based on the battery temperature sensed by the temperature sensing unit.

Further preferably, the control unit lowers the threshold when a difference between the first and second values is larger than a predetermined value for a predetermined period.

According to another aspect of the invention, a vehicle includes a secondary battery; an estimating unit for estimating a battery current input to or output from the secondary battery based on an input/output power of the secondary battery to output an estimated value; a current measuring unit for measuring the battery current to output a measured value; and a control unit for controlling the input/output power based on the estimated value and the measured value.

Preferably, the control unit calculates a first value obtained by performing time-based smoothing on a square of the estimated value and a second value obtained by performing time-based smoothing on a square of the measured value, and controls the input/output power based on a result of a comparison of larger one of the first and second values with a threshold.

More preferably, when the control unit determines that the larger one of the first and second values exceeds the threshold, the control unit limits the input/output power.

Further preferably, the input/output control device further includes a temperature sensing unit for sensing a battery temperature of the secondary battery. The control unit changes the limit value of the input/output power based on the battery temperature sensed by the temperature sensing unit.

Further preferably, the control unit lowers the threshold when a difference between the first and second values is larger than a predetermined value for a predetermined period.

Accordingly, the invention can reliably protect the secondary battery.

BEST MODES FOR CARRYING OUT THE INVENTION

Embodiments of the invention will now be described with reference to the drawings. In the following description, the same or corresponding portions bear the same reference numbers, and description thereof is not repeated.

[First Embodiment]

<Whole Structure>

Figure 1:
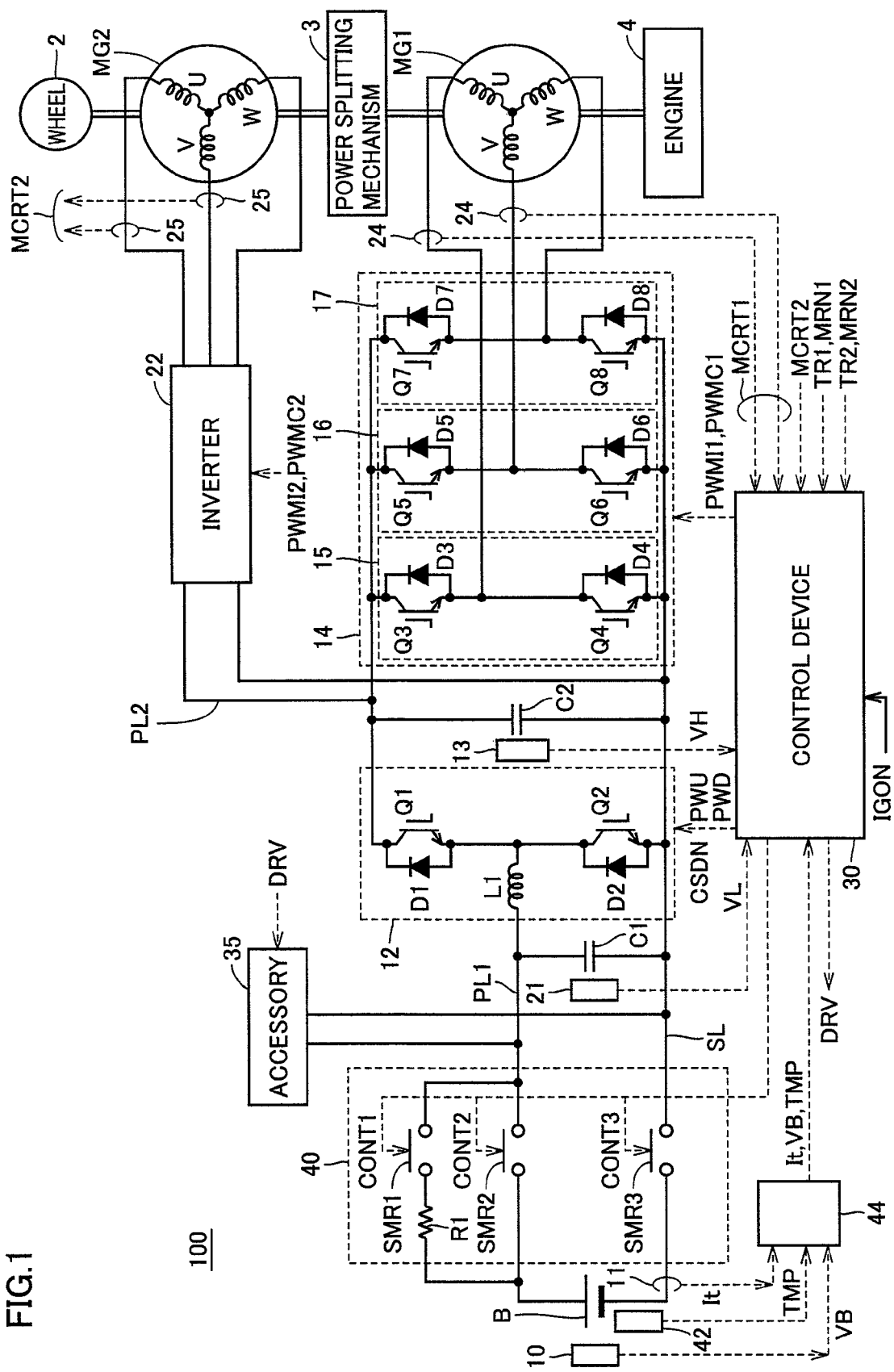
FIG. 1 shows a major structure of a vehicle 100 of a first embodiment of the invention.

FIG. 1 shows a major structure of a vehicle 100 of a first embodiment of the invention. Referring to FIG. 1, vehicle 100 includes a battery B, a connection unit 40, a booster converter 12, smoothing capacitors C1 and C2, voltage sensors 13 and 21, inverters 14 and 22, an engine 4, motor generators MG1 and MG2, a power splitting mechanism 3, wheels 2 and a control device 30.

Vehicle 100 further includes power lines PL1 and PL2, a ground line SL, a voltage sensor 10 sensing a voltage VB between terminals of battery B, a current sensor 11 sensing a current It flowing in battery B, a temperature sensor 42 sensing a temperature TMP of battery B and a monitor unit 44. Battery B may be a secondary battery such as a lead acid battery, a nickel hydrogen battery or a lithium-ion battery.

Connection unit 40 includes a system main relay SMR3 connected between a negative terminal and ground line SL, and a system main relay SMR2 connected between a positive terminal and a power line PL1 as well as a resistance R1 and a system main relay SMR1 that are connected in parallel with system main relay SMR2 and are connected in series together. System main relays SMR1-SMR3 are controlled to be turned on/off according to control signals CONT1-CONT3 provided from control device 30.

Capacitor C1 smoothes the terminal voltage of battery B when system main relays SMR1-SMR3 are on. Capacitor C1 is connected between power line PL1 and ground line SL. An accessory 35 is connected between power line PL1 and ground line SL. Accessory 35 is, e.g., an electric air conditioner, and is controlled according to a signal DRV provided from control device 30.

Voltage sensor 21 senses a terminal voltage VL, i.e., a voltage between terminals of capacitor C1 to output a result to control device 30. Booster converter 12 boosts a voltage of between terminals of capacitor C1. Capacitor C2 smoothes the voltage boosted by booster converter 12. Voltage sensor 13 senses a terminal voltage VH of smoothing capacitor C2 to provide a result to control device 30.

Inverter 14 converts a DC voltage provided from booster converter 12 into a three-phase AC voltage, and provides it to motor generator MG1.

Power splitting mechanism 3 is a mechanism coupled to engine 4 and motor generators MG1 and MG2 for distributing a drive power among them. For example, a planetary gear mechanism having three rotation shafts, i.e., a sun gear, a planetary gear and a ring gear may be used as the power splitting mechanism. These three rotation shafts are connected to rotation shafts of engine 4 and motor generators MG1 and MG2, respectively.

The rotation shaft of motor generator MG2 is coupled to wheels 2 via a reduction gear and a differential gear (both not shown). Also, power splitting mechanism 3 may be internally provided with a reduction unit for the rotation shaft of motor generator MG2. Further, this reduction unit may have a selectable reduction ratio.

Booster converter 12 includes a reactor L1 having an end connected to power line PL1, IGBT elements Q1 and Q2 connected in series between power line PL1 and ground line SL, and diodes D1 and D2 connected in parallel to IGBT elements Q1 and Q2, respectively.

The other end of reactor L1 is connected to an emitter of IGBT element Q1 and a collector of IGBT element Q2. Diode D1 has a cathode and an anode connected to a collector and an emitter of IGBT element Q1, respectively. Diode D2 has a cathode and an anode connected to a collector and an emitter of IGBT element Q2, respectively.

Inverter 14 receives the boosted voltage from booster converter 12 and, for example, drives motor generator MG1 for starting engine 4. Inverter 14 returns the electric power that is generated by motor generator MG1 driven by the power of engine 4 to booster converter 12. In this operation, control circuit 30 controls booster converter 12 to operate as a step-down circuit.

Inverter 14 includes U-, V- and W-phase arms 15, 16 and 17, which are connected in parallel with each other between power line PL2 and ground line SL.

U-phase arm 15 includes IGBT elements Q3 and Q4 connected in series between power line PL2 and ground line SL as well as diodes D3 and D4 connected in parallel to IGBT elements Q3 and Q4, respectively. Diode D3 has a cathode and an anode connected to a collector and an emitter of IGBT element Q3, respectively. Diode D4 has a cathode and an anode connected to a collector and an emitter of IGBT element Q4, respectively.

V-phase arm 16 includes IGBT elements Q5 and Q6 connected in series between power line PL2 and ground line SL as well as diodes D5 and D6 connected in parallel to IGBT elements Q5 and Q6, respectively. Diode D5 has a cathode and an anode connected to a collector and an emitter of IGBT element Q5, respectively. Diode D6 has a cathode and an anode connected to a collector and an emitter of IGBT element Q6, respectively.

W-phase arm 17 includes IGBT elements Q7 and Q8 connected in series between power line PL2 and ground line SL as well as diodes D7 and D8 connected in parallel to IGBT elements Q7 and Q8, respectively. Diode D7 has a cathode and an anode connected to a collector and an emitter of IGBT element Q7, respectively. Diode D8 has a cathode and an anode connected to a collector and an emitter of IGBT element Q8, respectively.

An intermediate point of each of U-, V- and W-phase arms is connected one end of the corresponding phase coil of motor generator MG1. More specifically, motor generator MG1 is a three-phase permanent magnet synchronous motor, and ends of the three, i.e., U-, V- and W-phase coils are connected to the middle points, respectively. The other end of the U-phase coil is connected to a connection node between IGBT elements Q3 and Q4. The other end of the V-phase coil is connected to a connection node between IGBT elements Q5 and Q6. The other end of the W-phase coil is connected to a connection node between IGBT elements Q7 and Q8.

IGBT elements Q1-Q8 described above may be replaced with other electric power switching elements such as power MOSFETs.

A current sensor 24 senses a current flowing in motor generator MG1 as a motor current value MCRT1, and provides motor current value MCRT1 to control device 30.

Inverter 22 is connected to power line PL2 and ground line SL. Inverter 22 converts the DC voltage provided from booster converter 12 into a three-phase AC voltage, and provides it to motor generator MG2 driving wheels 2. Inverter 22 returns the electric power generated by motor generator MG2 performing regenerative braking to booster converter 12. In this operation, control device 30 controls booster converter 12 to operate as a step-down circuit. Although an internal structure of inverter 22 is not shown, it is substantially the same as that of inverter 14, and description thereof is not repeated.

A current sensor 25 senses a current flowing in motor generator MG2 as a motor current value MCRT2, and provides motor current value MCRT2 to control device 30.

Monitor unit 44 monitors voltage VB, current It and temperature TMP, and transmits a result of the monitor (i.e., voltage VB, current It and temperature IMP) to control device 30. Vehicle 100 may not include monitor unit 44. In this case, voltage VB, current It and temperature TMP are directly provided to control device 30.

Control device 30 receives torque command values TR1 and TR2, motor revolution speeds MRN1 and MRN2, respective values of voltages VB and VH and current It, motor current values MCRT1 and MCRT2, and a start instruction IGON. Control device 30 provides a step-up instruction PWU, a step-down instruction PWD and a signal CSDN instructing operation prohibition to booster converter 12.

Further, control device 30 provides a drive instruction PWMI1 and a regeneration instruction PWMC1 to inverter 14. Drive instruction PWMI1 is issued for converting the output of booster converter 12, i.e., the DC voltage into the AC voltage used for driving motor generator MG1. Regeneration instruction PWMC1 is issued for converting the AC voltage generated by motor generator MG1 into the DC voltage, and returning it to the side of booster converter 12.

Likewise, control device 30 provides a drive instruction PWMI2 and a regeneration instruction PWMC2 to inverter 22. Drive instruction PWMI2 is issued for converting the DC voltage into the AC voltage used for driving motor generator MG2. Regeneration instruction PWMC2 is issued for converting the AC voltage generated by motor generator MG2 into the DC voltage, and returning it to the side of booster converter 12.

Control device 30 sends signal DRV to accessory 35 to operate it.

Figure 2:
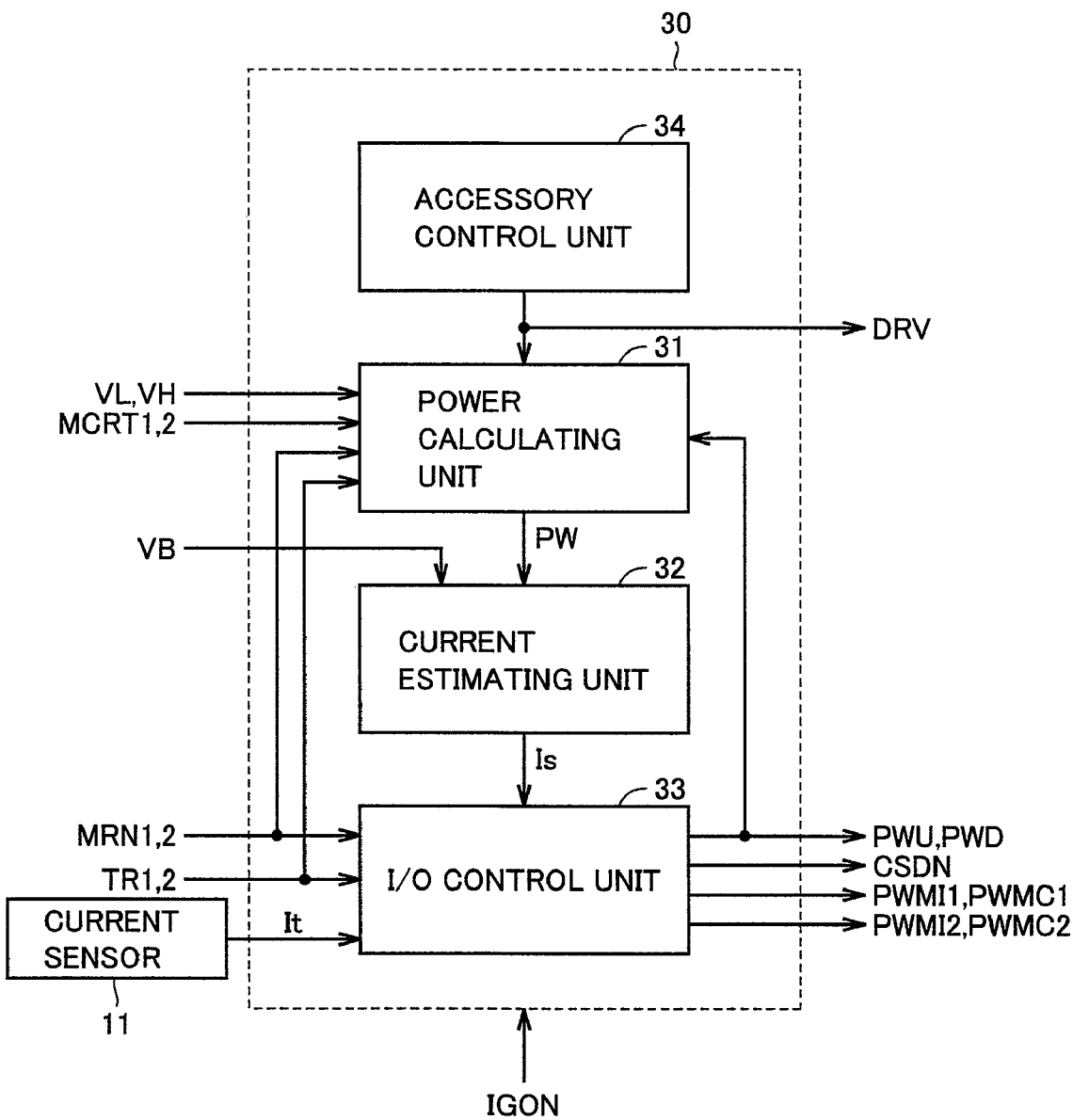
FIG. 2 is a functional block diagram of a control device 30 in FIG. 1.

FIG. 2 is a functional block diagram of control device 30 in FIG. 1. Control device 30 in FIG. 2 can be implemented by either of hardware and software. Referring to FIG. 2, control device 30 includes an electric power calculating unit 31, a current estimating unit 32, an input/output control unit 33 and an accessory control unit 34.

Referring to FIGS. 2 and 1, electric power calculating unit 31 calculates electric powers of motor generators MG1 and MG2, a loss of booster converter 12 and a consumed power of accessory 35. Electric power calculating unit 31 totalizes them to obtain an electric power PW that is an input/output power of battery B.

More specifically, electric power calculating unit 31 calculates the electric power of motor generator MG1 based on torque command value TR1 and motor revolution speed MRN1. Electric power calculating unit 31 calculates the electric power of motor generator MG2 based on torque command value TR2 and motor revolution speed MRN2. Electric power calculating unit 31 calculates a loss of booster converter 12 based on step-up instruction PWU, step-down instruction PWD and voltages VL and VH. Electric power calculating unit 31 calculates the consumed power of accessory 35 shown in FIG. 1 based on signal DRV provided from accessory control unit 34. Electric power calculating unit 31 totalizes these electric powers to obtain power PW.

Current estimating unit 32 receives power PW from electric power calculating unit 31. Current estimating unit 32 divides power PW by voltage VB to calculate an estimated value of the input/output current of battery B. Current estimating unit 32 outputs the estimated value, i.e., an estimated current Is.

Input/output control unit 33 receives torque command values TR1 and TR2 as well as motor revolution speeds MRN1 and MRN2. Input/output control unit 33 further receives estimated current Is and current It. Current It is a measured value of the input/output current of battery B that is measured by current sensor 11. Current It will be referred to as "measured current It" hereinafter for distinguishing it from estimated current Is.

Input/output control unit 33 controls the electric power that is supplied to or from battery B, using estimated current Is and measured current It. More specifically, input/output control unit 33 controls booster converter 12 and inverters 14 and 22 so that the input/output power of battery B may not exceed a limit value. Therefore, input/output control unit 33 issues step-up instruction PWU, step-down instruction PWD, signal CSDN, drive instructions PWMI1 and PWMI2, and regeneration instructions PWMC1 and PWMC2.

As described above, the input/output control device of the secondary battery according to the embodiment includes current estimating unit 32 that estimates the battery current supplied to or from battery B based on the input/output power of battery B, and outputs the estimated value (estimated current Is), current sensor 11 that measures the battery current and outputs the measured value (measured current It), and input/output control unit 33 that receives the estimated value and the measured value, and controls the input/output power. Since the input/output control device uses measured current It as well as estimated current Is for controlling the input and output of battery B, it can reliably suppress the significant increase in heating value of battery B as well as in heating value of peripheral parts of battery B (e.g., system main relays SMR1-SMR3, power lines PL1 and PL2, and ground line SL). Accordingly, the embodiment can reliably protect battery B.

The case where the input/output of battery B is controlled based on, e.g., only measured current It will be discussed below. When a failure occurs in current sensor 11, a significant difference may occur between measured current It and a true current value. When measured current It is significantly smaller than the true current value, input/output control unit 33 determines that the load of battery B is smaller than the actual load. Accordingly, the current may be supplied to/from battery B without limiting the current flowing in battery B. In this case, it is difficult to suppress heat generation from battery B and the peripheral parts.

For overcoming the above problem, a configuration having, e.g., dual current sensors may be employed. In this case, it can be considered that even when a failure occurs in one of the two current sensors, the input/output of the battery can be controlled using the current value of the other current sensor. However, increase in number of the current sensors raises a cost and increases an installation space.

According to the embodiment, the input/output current of the secondary battery can be obtained by the two different methods (i.e., measurement of the battery current and estimation of the battery current). For example, when measured current It becomes much lower than the true value due to a failure in current sensor 11, input/output control unit 33 controls the input/output of the battery according to estimated current Is. Thereby, the electric power of an appropriate magnitude can be supplied to/from battery B. Accordingly, the embodiment can suppress the heat generation from battery B and the peripheral parts, and therefore can reliably protect battery B. Also, the embodiment can suppress the increase in number of the current sensor.

Further, the embodiment can suppress the increase in heat generated from battery B, and therefore can suppress increase in heat generated from peripheral parts of battery B. Accordingly, heat capacities, e.g., of the peripheral parts can be small so that sizes of the peripheral parts can be small.

Figure 3:
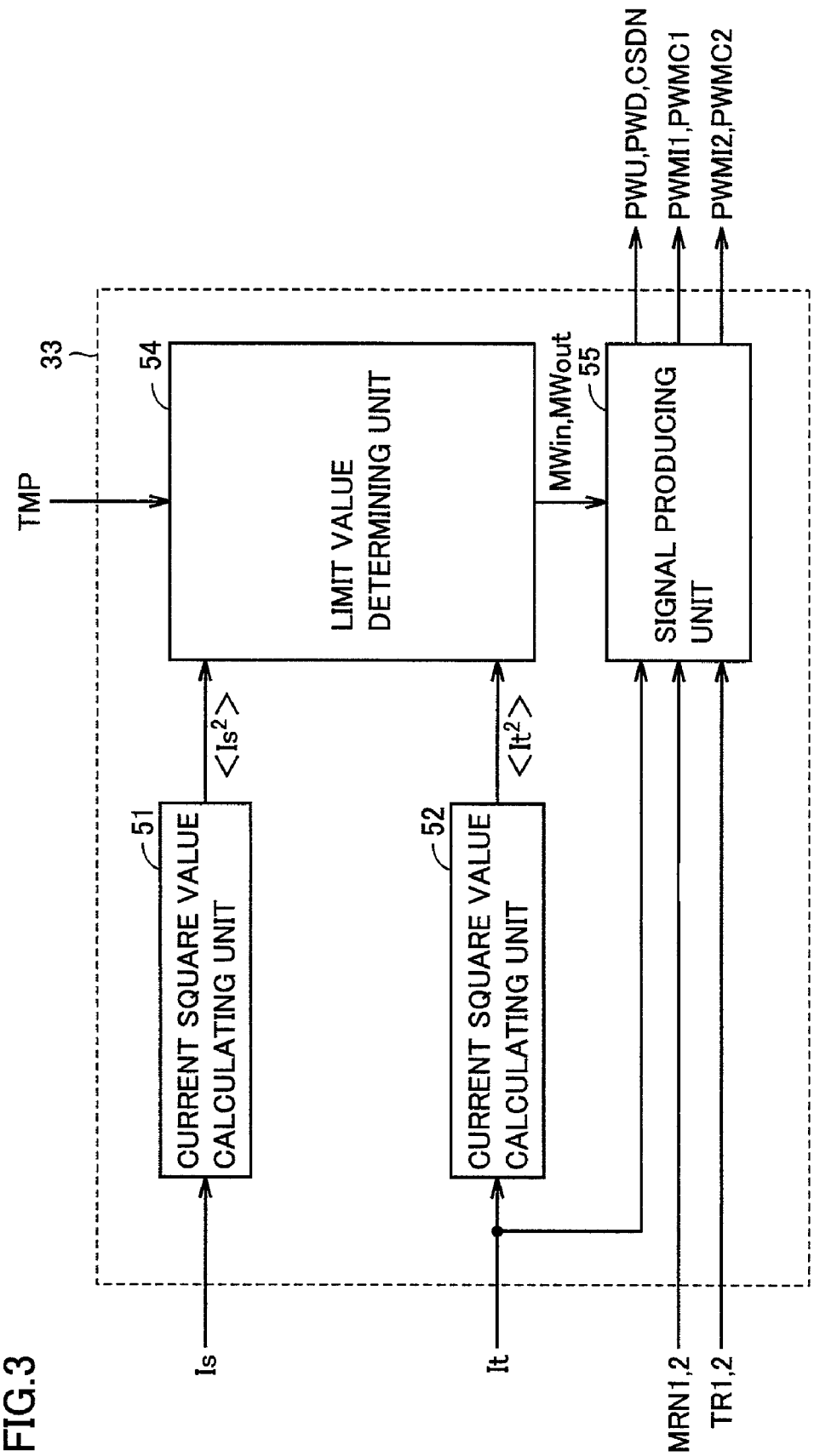
FIG. 3 is a functional block diagram of an input/output control unit 33 in FIG. 2.

FIG. 3 is a functional block diagram of input/output control unit 33 in FIG. 2. Referring to FIG. 3, input/output control unit 33 includes current square value calculating units 51 and 52, a limit value determining unit 54 and a signal producing unit 55.

Current square value calculating unit 51 obtains estimated current Is at predetermined intervals, e.g., of 100 milliseconds, and squares estimated current Is. Current square value calculating unit 51 calculates current square value $<Is^2>$ by smoothing time-based variations in square value of estimated current Is.

Similarly to current square value calculating unit 51, current square value calculating unit 52 obtains measured current It at predetermined intervals and squares measured current It. Current square value calculating unit 52 calculates current square value $<It^2>$ by smoothing time-based variations in square value of measured current It.

More specifically, current square value calculating units 51 and 52 performs primary filtering processing to smooth the current square values. Assuming that the current square value before the smoothing at a certain time t is $I^2(t)$ and the current square value after the smoothing is $<I^2>(t)$, current square value $<I^2>(t)$ is represented according to the following equation (1), where current square value $<I^2>(t-1)$ indicates current square value $<I^2>$ one period before time t, and T indicates a constant in filtering processing.

$$<I^2>(t)=\{(T-1)\times<I^2>(t)+1\times I^2(t)\}/T \qquad (1)$$

Figure 4:
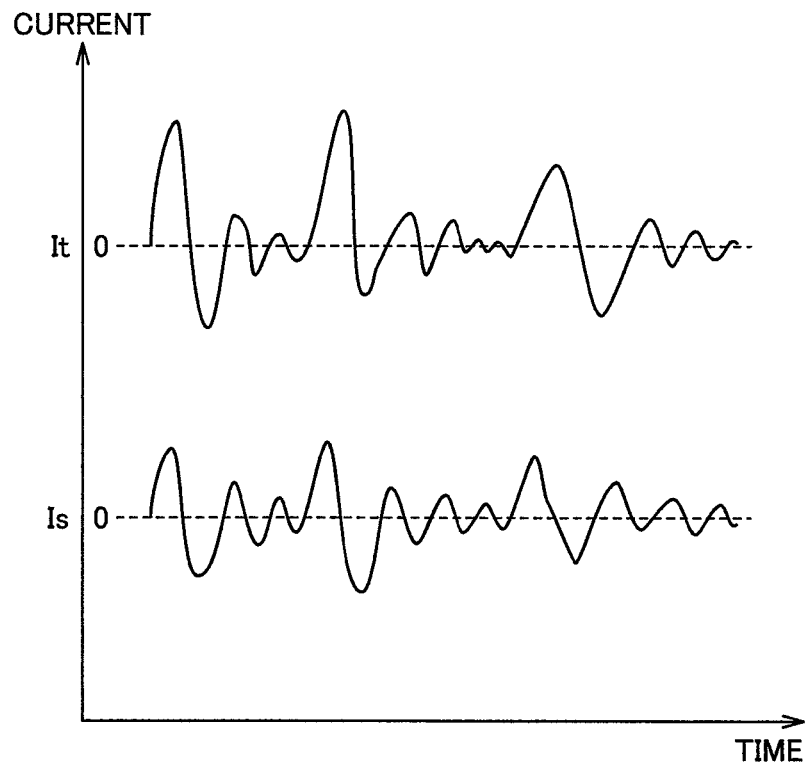
FIG. 4 shows time-based variations in estimated current Is and measured current It.
Figure 5:
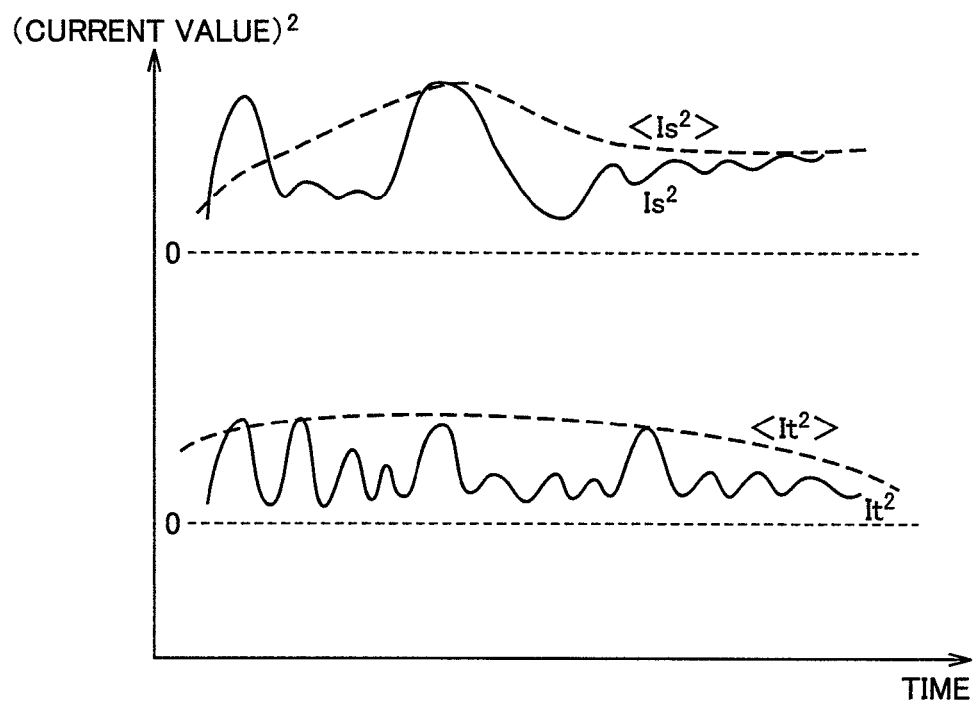
FIG. 5 shows a current square value before smoothing processing and a current square value after the smoothing processing.

FIG. 4 shows time-based variations in estimated current Is and measured current It. FIG. 5 shows the current square value before the smoothing processing and the current square value after the smoothing processing.

Referring to FIGS. 4 and 5, the magnitudes and signs of the input/output currents (measured current It and estimated current Is) of battery B always change according to the operation situation of vehicle 100. It can be regarded that the heating value of battery B depends on the square of the current value. For estimating the heating value of battery B, measured current It (and estimated current Is) are squared. However, the magnitudes of the input/output currents of battery B always change so that the current square values ($Is^2$ and $It^2$) always change. Current square values ($Is^2$, $It^2$) are smoothed to determine a change (an increase or a decrease) of the current square values. From the time-based variations in current square value, it is possible to determine which one of current square values $<Is^2>$ and $<It^2>$ is larger.

Returning to FIG. 3, limit value determining unit 54 receives current square values $<It^2>$ and $<Is^2>$, and also receives temperature TMP. Limit value determining unit 54 selects larger one from between current square values $<It^2>$ and $<Is^2>$. Limit value determining unit 54 determines an input limit value MWin and an output limit value MWout of battery B based on the selected current square value. Signal producing unit 55 receives measured current It, torque command values TR1 and TR2, motor revolution speeds MRN1 and MRN2, input limit value MWin and output limit value MWout. Based on these values, signal producing unit 55 issues step-up instruction PWU, step-down instruction PWD, signal CSDN, drive instructions PWMI1 and PWMI2, and regeneration instructions PWMC1 and PWMC2.

Then, description will be given on the processing of the input/output control device for the secondary battery according to the embodiment. In the following description, processing of reducing the input/output limit value will be referred to as "input/output limiting processing", and processing of restoring the input/output limit value to an original value will be referred to as "releasing processing".

<Input/Output Limiting Processing>

Figure 6:
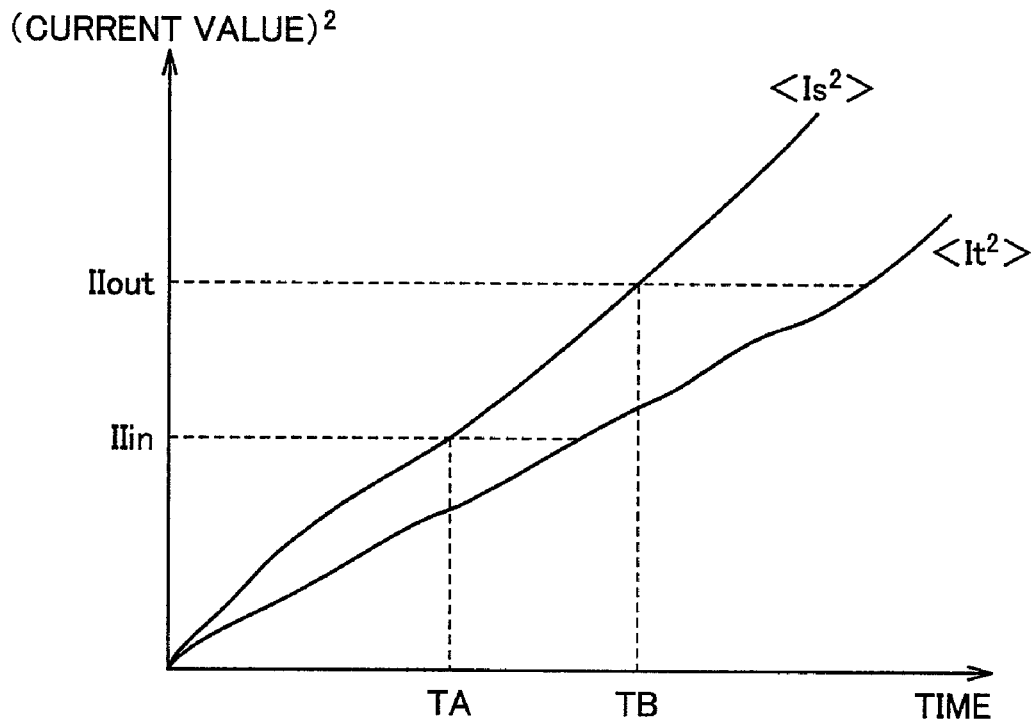
FIG. 6 illustrates input/output limiting processing in the first embodiment.

FIG. 6 illustrates input/output limiting processing in the first embodiment. Referring to FIG. 6, when the input/output power of battery B increases with time, current square values $<It^2>$ and $<Is^2>$ also increases. Although current square value $<Is^2>$ is larger than current square value $<It^2>$ in FIG. 6, the relationship in magnitude between current square values $<Is^2>$ and $<It^2>$ is not restricted to the above.

Thresholds IIin and IIout are set for the current square value. Threshold IIin is used when the power is input to battery B. Threshold IIout is used when the power is output from battery B. When the power is input to battery B, current square value $<Is^2>$ reaches threshold IIin (time TA) before current square value $<It^2>$ reaches it. After time TA, limit value determining unit 54 in FIG. 3 decreases input limit value MWin.

When battery B outputs the power, current square value $<Is^2>$ reaches threshold IIout (time TB) before current square value $<It^2>$ reaches it. After time TB, limit value determining unit 54 decreases output limit value MWout.

The fact that the current square value increases means that the heating values of battery B and its peripheral parts increase. In the first embodiment, when larger one of the two current square values exceeds the threshold, the input/output limit value of battery B is decreased to limit the power input to or output from battery B. Thereby, even when smaller one of the two current square values is closer to the true value, the input/output power of battery B can be further limited. Accordingly, it is possible to suppress more effectively the significant increase in heating value of battery B and the peripheral parts.

When the current value is merely squared, the relationship in magnitude between the current square values ($Is^2$ and $It^2$) may always change. Therefore, when the input/output limit value is set based on the current square values ($Is^2$ and $It^2$), the input/output limit value thus set may change frequently. In this case, it may be impossible to suppress effectively the heat generation from battery B and the peripheral parts. As shown in FIG. 6, the larger one of the two current square values is determined based on the time elapsing of the smoothed current square value (in other words, time-based changes in smoothed current square values) so that the input/output limit value can be stabilized. This offers the effect of suppressing the heat generation of battery B and its peripheral parts.

Figure 7:
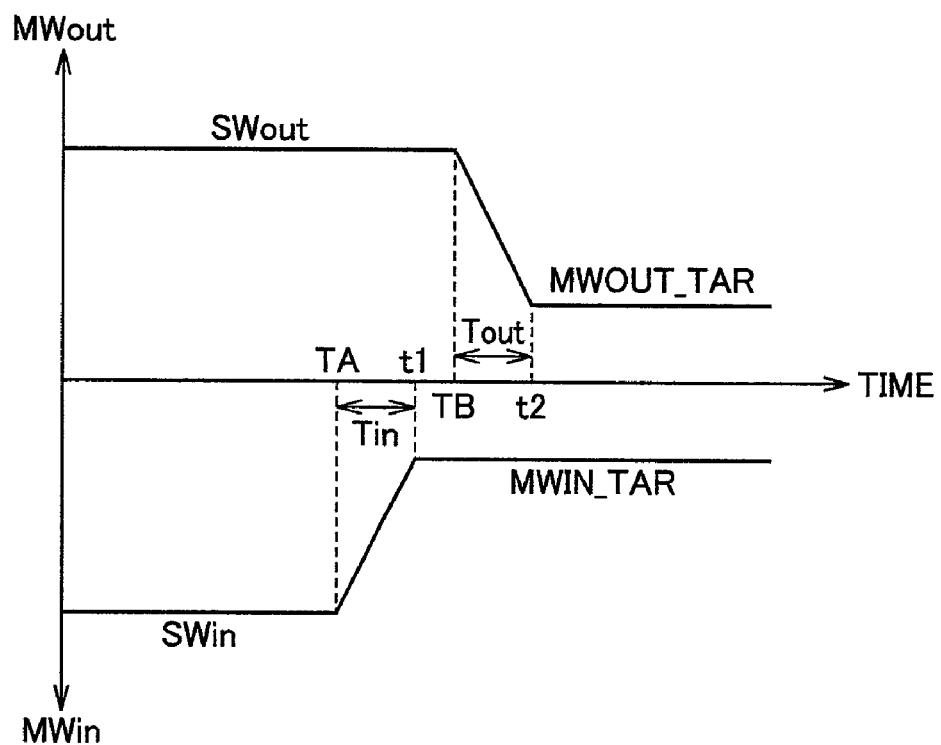
FIG. 7 shows time-based changes in input/output limit value in input/output limiting processing of the first embodiment.

FIG. 7 shows time-based changes in input/output limit value in the input/output limiting processing of the first embodiment. Referring to FIGS. 7 and 6, input limit value MWin is kept at SWin before time TA. At time TA, current square value $<Is^2>$ reaches threshold IIin so that limit value determining unit 54 (FIG. 3) will gradually decrease input limit value MWin from SWin thereafter.

At time t1, input limit value MWin reaches MWIN_TAR. After time t1, limit value determining unit 54 keeps input limit value MWin at MWIN_TAR. A time Tin represents a period from time TA to time t1.

Before time TB, output limit value MWout is kept at SWout. When current square value $<Is^2>$ reaches threshold IIout at time TB, limit value determining unit 54 gradually decreases output limit value MWout from SWout.

At time t2, output limit value MWout reaches MWOUT_TAR. After time t2, limit value determining unit 54 keeps the output limit value at MWOUT_TAR. A time Tout represents a period from time TB to time t2.

The changes in input and output limit values MWin and MWout will be described below further in detail. Limit value determining unit 54 calculates input limit value MWin according to the following equation (2). In the equation (2), mgin represents a gain that changes with elapsing of time.

$$MWin = MWIN\_TAR + (SWin - MWIN\_TAR) \times mgin \quad (2)$$

Figure 8:
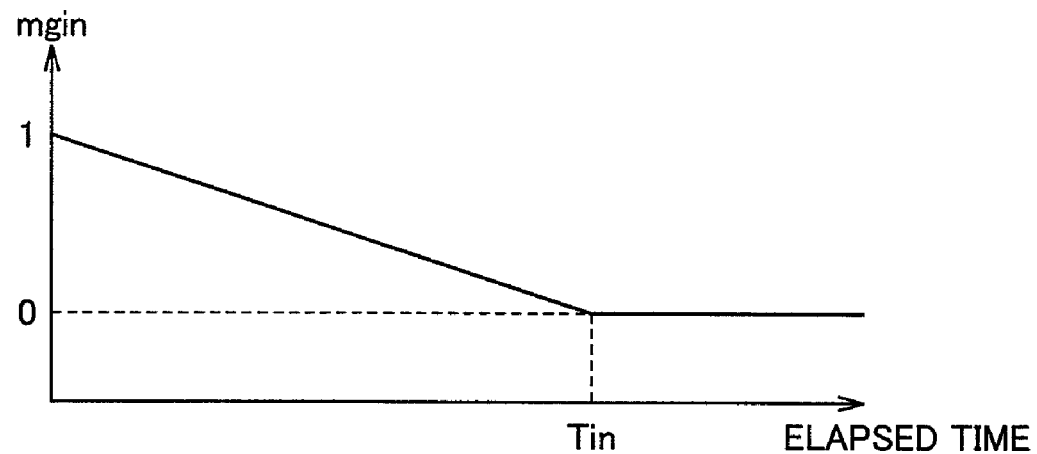
FIG. 8 shows time-based changes in gain mgin in the input/output limiting processing.

FIG. 8 shows time-based changes in gain mgin in the input/output limiting processing. Referring to FIG. 8, the abscissa of the graph gives a time elapsed since time TA (see FIGS. 5 and 6). At time TA, gain mgin is 1. After time TA, gain mgin gradually decreases. When the time elapsed since time TA becomes equal to or larger than Tin, gain mgin becomes 0. Before time TA, mgin is equal to 1.

Limit value determining unit 54 calculates output limit value MWout according to the following equation (3). In the equation (3), mgout represents a gain that changes with elapsing of time.

$$MWout = MWout\_TAR + (SWout - MWOUT\_TAR) \times mgout \quad (3)$$

Figure 9:
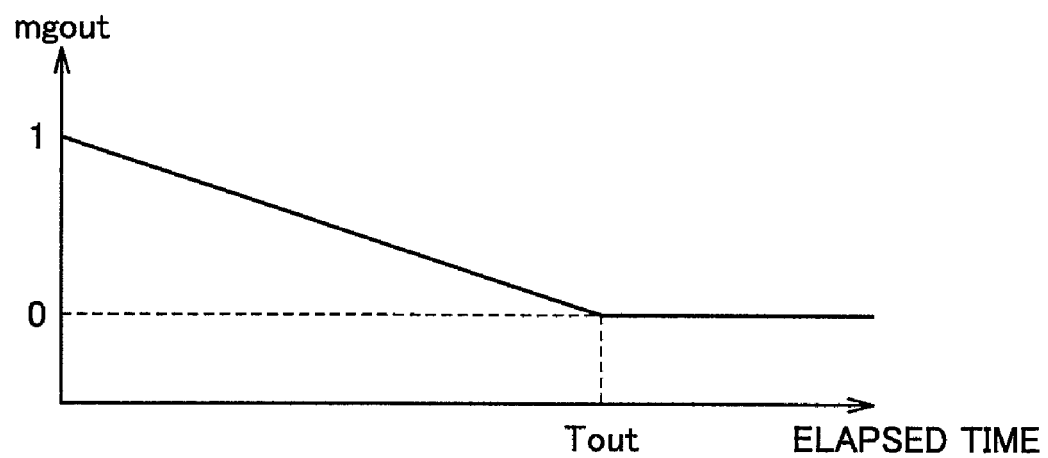
FIG. 9 shows time-based changes in gain mgout in input/output limiting processing.

FIG. 9 shows time-based changes in gain mgout in the input/output limiting processing. Referring to FIG. 9, the abscissa of the graph gives the time elapsed since time TB (see FIGS. 5 and 6). Similarly to the time-based changes in gain mgin, gain mgout is 1 at time TB, and will gradually decrease after time TB. When the time elapsed since time TB becomes equal to or larger than Tout, gain mgout becomes 0. Before time TB, mgout is equal to 1.

Figure 10:
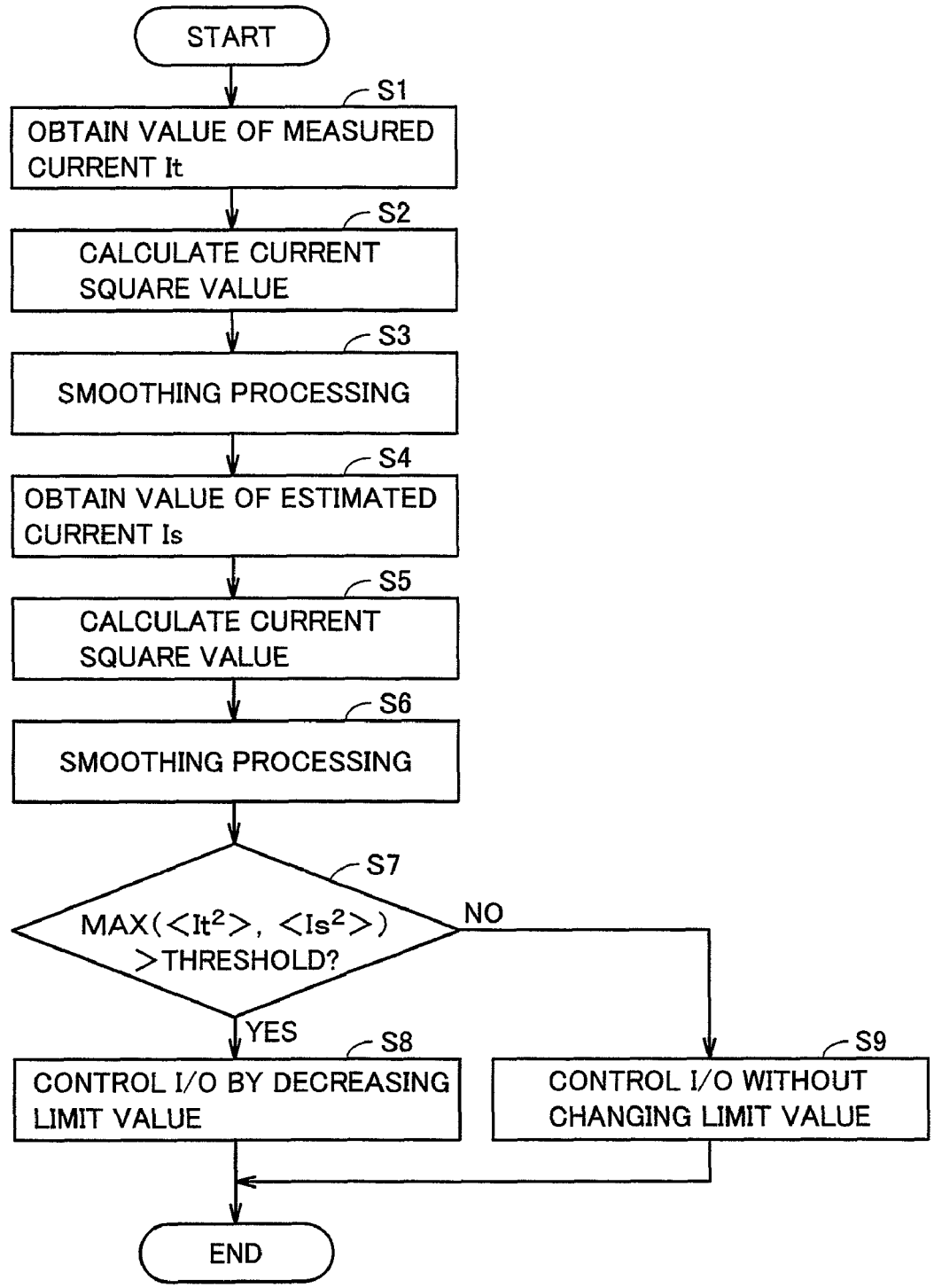
FIG. 10 is a flowchart showing input/output limiting processing executed by an input/output control unit 33 in FIG. 3.

FIG. 10 is a flowchart showing the input/output limiting processing executed by input/output control unit 33 in FIG. 3. The processing in this flowchart is called up from a main routine for execution at constant time intervals or when a predetermined condition is satisfied.

Referring to FIGS. 10 and 3, current square value calculating unit 52 obtains a value of measured current It in a step S1. In a step S2, current square value calculating unit 52 calculates a square of measured current It. In a step S3, current square value calculating unit 52 calculates current square value $<It^2>$ by smoothing the time-based variations in square of measured current It.

In a step S4, current square value calculating unit 51 obtains the value of estimated current Is. In a step S5, current square value calculating unit 51 calculates the square of estimated current Is. In a step S6, current square value calculating unit 51 calculates current square value $<Is^2>$ by smoothing time-based variations in square of estimated current Is.

The processing in steps S1-S3 may be executed in parallel with the processing in steps S4-S5.

In a step S7, limit value determining unit 54 determines whether larger one of current square values $<It^2>$ and $<Is^2>$, which is represented as "MAX($<It^2>$, $<Is^2>$)" in FIG. 10, is larger than the threshold or not. The threshold at the time of power input to battery B is threshold IIin. The threshold at the time of power output from battery B is threshold IIout.

When the larger one of current square values $<It^2>$ and $<Is^2>$, i.e., MAX($<It^2>$, $<Is^2>$) is larger than the threshold (YES in step S7), limit value determining unit 54 decreases the limit value. Signal producing unit 55 produces step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S8).

When the larger one of current square values $<It^2>$ and $<Is^2>$, i.e., MAX($<It^2>$, $<Is^2>$) is equal to or smaller than the threshold (NO in step S7), limit value determining unit 54 does not change the limit value. In this case, signal producing unit 55 likewise issues step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S9). When the processing in step S8 or S9 ends, the whole processing ends.

<Releasing Processing>

Figure 11:
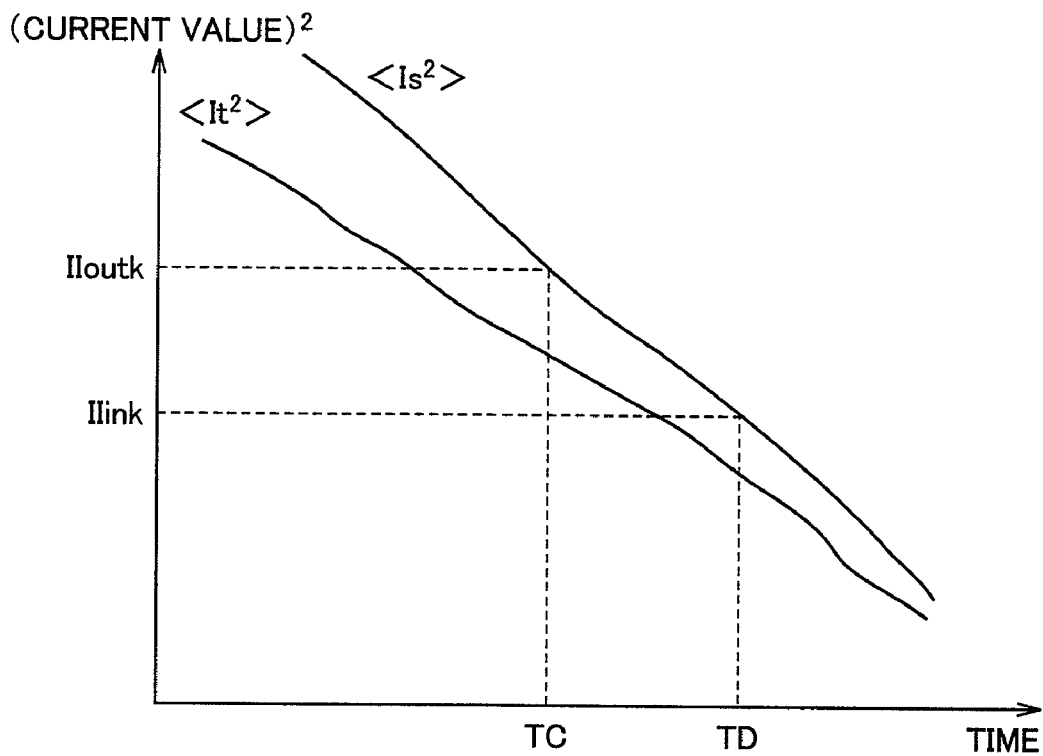
FIG. 11 illustrates releasing processing.

FIG. 11 illustrates releasing processing. Referring to FIG. 11, input/output limiting processing decreases current square values $<It^2>$ and $<Is^2>$ with elapsing of time. Similarly to FIG. 6, current square value $<Is^2>$ is larger than current square value $<It^2>$ in FIG. 11, but the relationship in magnitude between current square values $<Is^2>$ and $<It^2>$ is not restricted to the above.

A threshold IIink represents a threshold used when the power is input to battery B. A threshold IIoutk represents a threshold used when the power is output from battery B. When the power is input to battery B, current square value $<Is^2>$ reaches threshold IIink after current square value $<It^2>$ reaches it (time TD). After time TD, limit value determining unit 54 in FIG. 3 gradually increases input limit value MWin.

When battery B outputs the power, current square value $<Is^2>$ likewise reaches threshold IIoutk after current square value $<It^2>$ reaches it (time TC). After time TC, limit value determining unit 54 gradually increases output limit value MWout.

Figure 12:
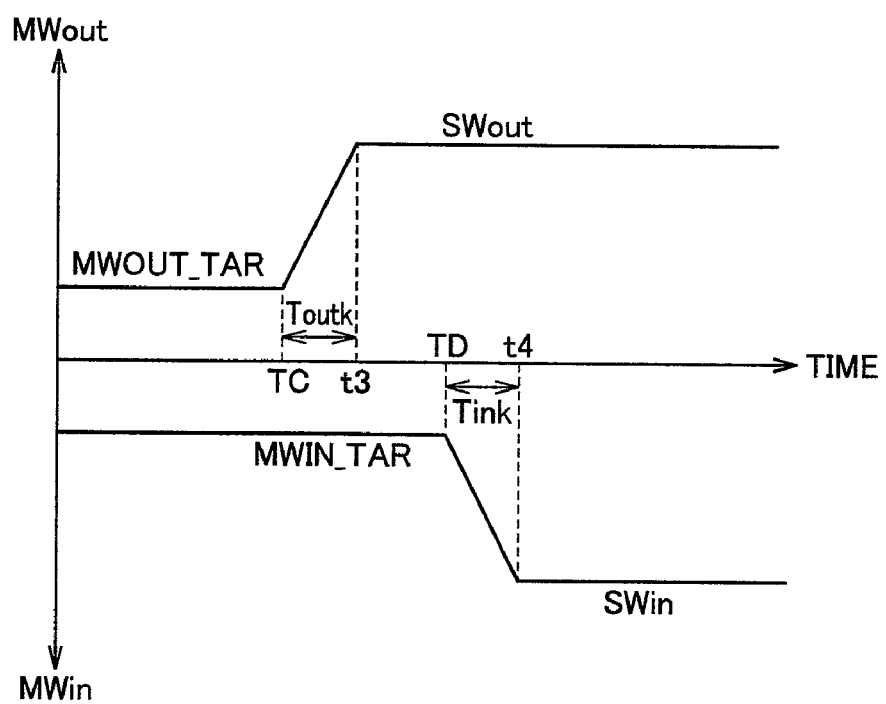
FIG. 12 shows time-based changes in input/output limit value in the releasing processing of the first embodiment.

FIG. 12 shows time-based changes in input/output limit value in the releasing processing of the first embodiment. Referring to FIGS. 12 and 11, input limit value MWin is kept at MWIN_TAR before time TD. After current square value $<Is^2>$ reaches threshold IIink at time TD, limit value determining unit 54 (FIG. 3) gradually increases input limit value MWin from MWIN_TAR according to the equation (2). At time t4, input limit value MWin reaches SWin. After time t4, limit value determining unit 54 keeps input limit value MWin at SWin. A time Tink represents a period from time TD to time t4.

When battery B outputs the power, output limit value MWout is kept at MWOUT_TAR before time TC. When current square value $<Is^2>$ reaches threshold IIout at time TC, limit value determining unit 54 gradually increases output limit value MWout from MWOUT_TAR according to the equation (3). At time t3, output limit value MWout reaches SWout. After time t3, limit value determining unit 54 keeps output limit value MWout at SWout. A time Toutk represents a period from time TC to time t3.

Figure 13:
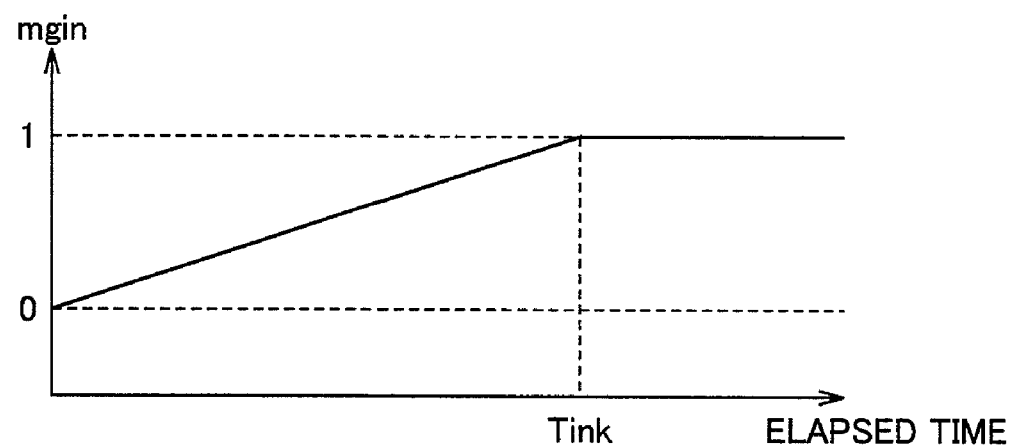
FIG. 13 shows time-based changes in gain mgin in the releasing processing.

FIG. 13 shows time-based changes in gain mgin in the releasing processing. Referring to FIG. 13, the abscissa of the graph gives the time elapsed since time TD (see FIGS. 11 and 12). At time TD, gain mgin is 0. After time TD, gain mgin gradually increases. When the time elapsed since time TD becomes equal to or larger than Tink, gain mgin becomes 1.

Figure 14:
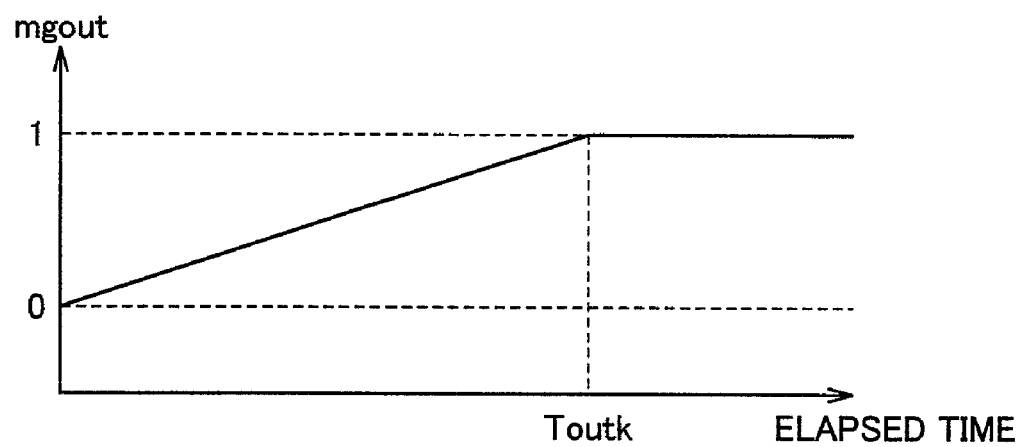
FIG. 14 shows time-based changes in gain mgout in the releasing processing.

FIG. 14 shows time-based changes in gain mgout in the releasing processing. Referring to FIG. 14, the abscissa of the graph gives the time elapsed since time TC (see FIGS. 11 and 12). Similarly to the time-based changes in gain mgin, gain mgout is 0. After time TC, gain mgout gradually increases. When the time elapsed since time TC becomes equal to or larger than Toutk, gain mgout becomes 1.

Figure 15:
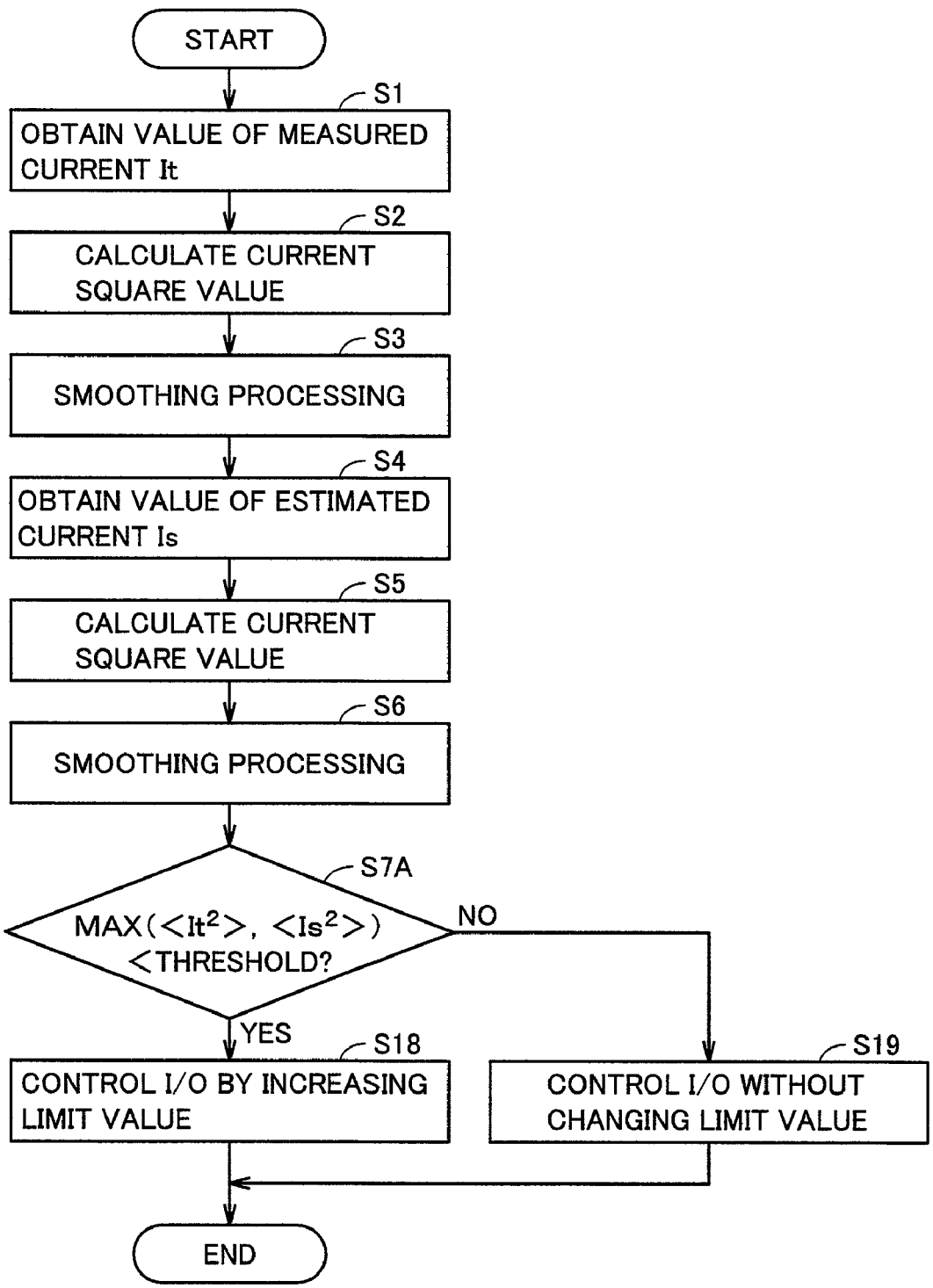
FIG. 15 is a flowchart showing the releasing processing executed by input/output control unit 33 in FIG. 3.

FIG. 15 is a flowchart showing the releasing processing executed by input/output control unit 33 in FIG. 3. The processing in this flowchart is called up from a main routine for execution at constant time intervals or when a predetermined condition is satisfied.

Referring to FIGS. 15 and 10, the releasing processing differs from the input/output limiting processing in that processing in steps S7A, S18 and S19 is executed instead of the processing in steps S7, S8 and S9. The processing in other steps in the flowchart of FIG. 15 is substantially the same as those in the corresponding steps in the flowchart of FIG. 10. Accordingly, the processing in steps S7A, S18 and S19 will be described below, and description of the processing in the other steps is not repeated.

Referring to FIGS. 15 and 3, limit value determining unit 54 determines in step S7A whether larger one of current square values $<It^2>$ and $<Is^2>$, i.e., MAX($<It^2>$, $<Is^2>$) is larger than the threshold or not. The threshold at the time of power input to battery B is threshold IInk. The threshold at the time of power output from battery B is threshold IIoutk.

When the larger one of current square values $<It^2>$ and $<Is^2>$, i.e., MAX($<It^2>$, $<Is^2>$) is smaller than the threshold (YES in step S7A), limit value determining unit 54 increases the limit value. Signal producing unit 55 issues, based on the limit value, step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S18).

When the larger one of current square values $<It^2>$ and $<Is^2>$, i.e., MAX($<It^2>$, $<Is^2>$) is equal to or larger than the threshold (NO in step S7A), limit value determining unit 54 does not change the limit value. In this case, signal producing unit 55 likewise issues step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S19). When the processing in step S18 or S19 ends, the whole processing ends.

According to the first embodiment, as described above, the input/output control of the battery is performed based on the measured current and the estimated current so that the significant increase in heating value of the battery can be suppressed more reliably. Accordingly, the first embodiment can protect the battery more reliably.

[Second Embodiment]

Structures of a vehicle and an input/output control device of a secondary battery according to a second embodiment of the invention are substantially the same as those of the first embodiment, and therefore description thereof is not repeated.

In the first embodiment, SWin, SWout, MWIN_TAR and MWOUT_TAR in FIG. 7 are fixed values, respectively. The second embodiment is configured to change these values according to the battery temperature (temperature TMP shown in FIG. 1).

Figure 16:
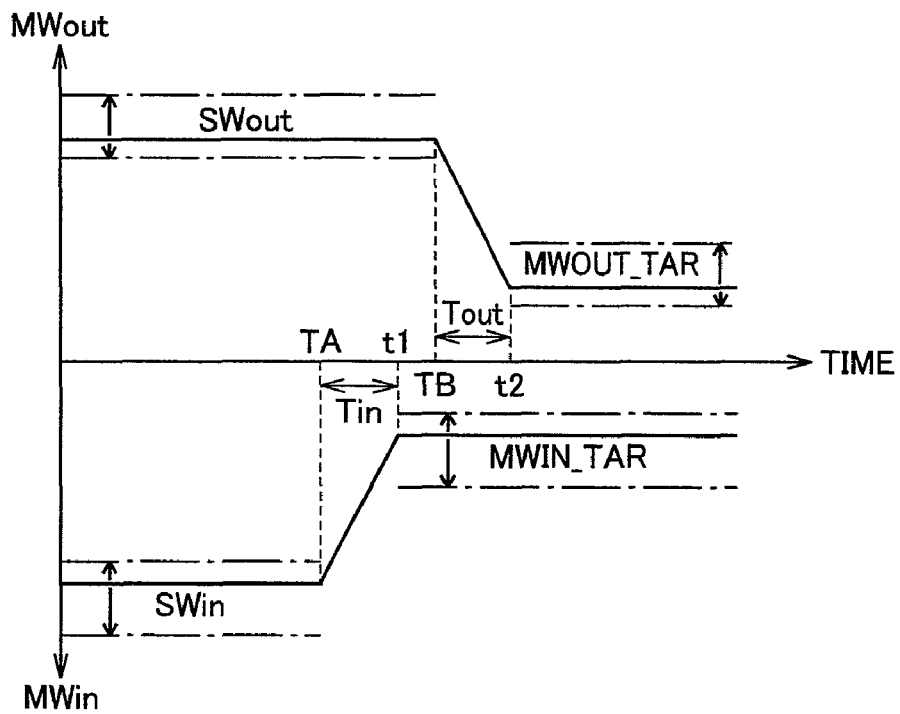
FIG. 16 shows time-based changes in input/output limit value in the input/output limiting processing of a second embodiment.
Figure 17:
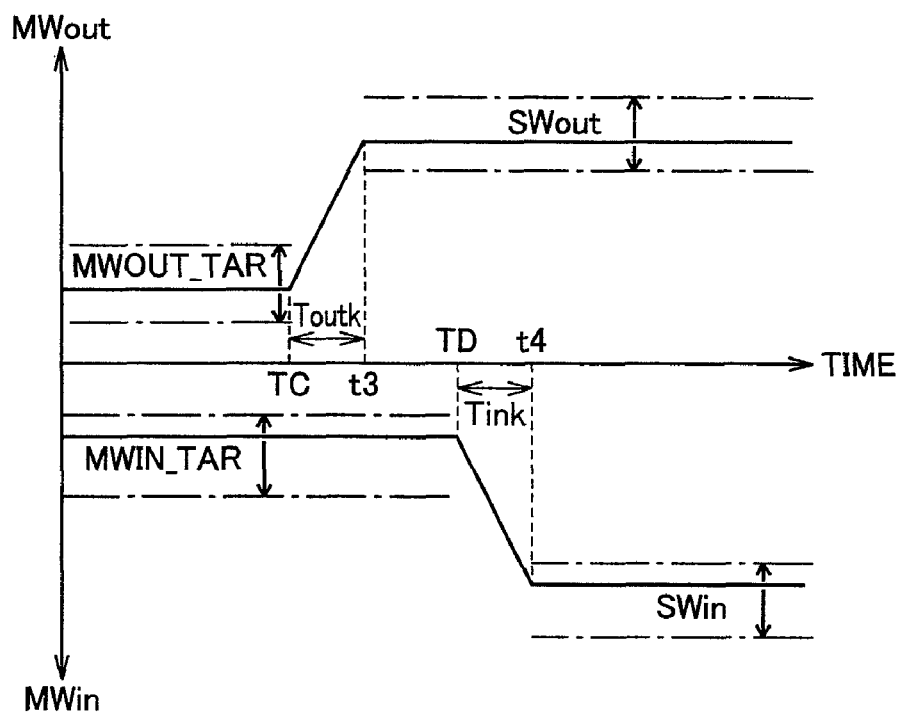
FIG. 17 shows time-based changes in input/output limit value in the releasing processing of the second embodiment.

FIG. 16 shows time-based changes in input/output limit value in the input/output limiting processing of the second embodiment. FIG. 17 shows time-based changes in input/output limit value in the releasing processing of the second embodiment. Referring to FIGS. 16 and 17, when the power is input to battery B, limit value determining unit 54 (FIG. 3) decreases SWin and MWIN_TAR according to the rising of the battery temperature, and increases SWin and MWIN_TAR according to the lowering of the battery temperature. Likewise, when battery B outputs the power, limit value determining unit 54 decreases SWout and MWOUT_TAR according to the rising of the battery temperature, and increases SWout and MWOUT_TAR according to the lowering of the battery temperature.

When the input/output limit value is to be changed, limit value determining unit 54 changes the foregoing values according to the battery temperature. When the battery temperature is high and the limit value is to be decreased, the time-based change rate of the limit value can be set large. Therefore, the rising rate of the battery temperature can be set small.

Figure 18:
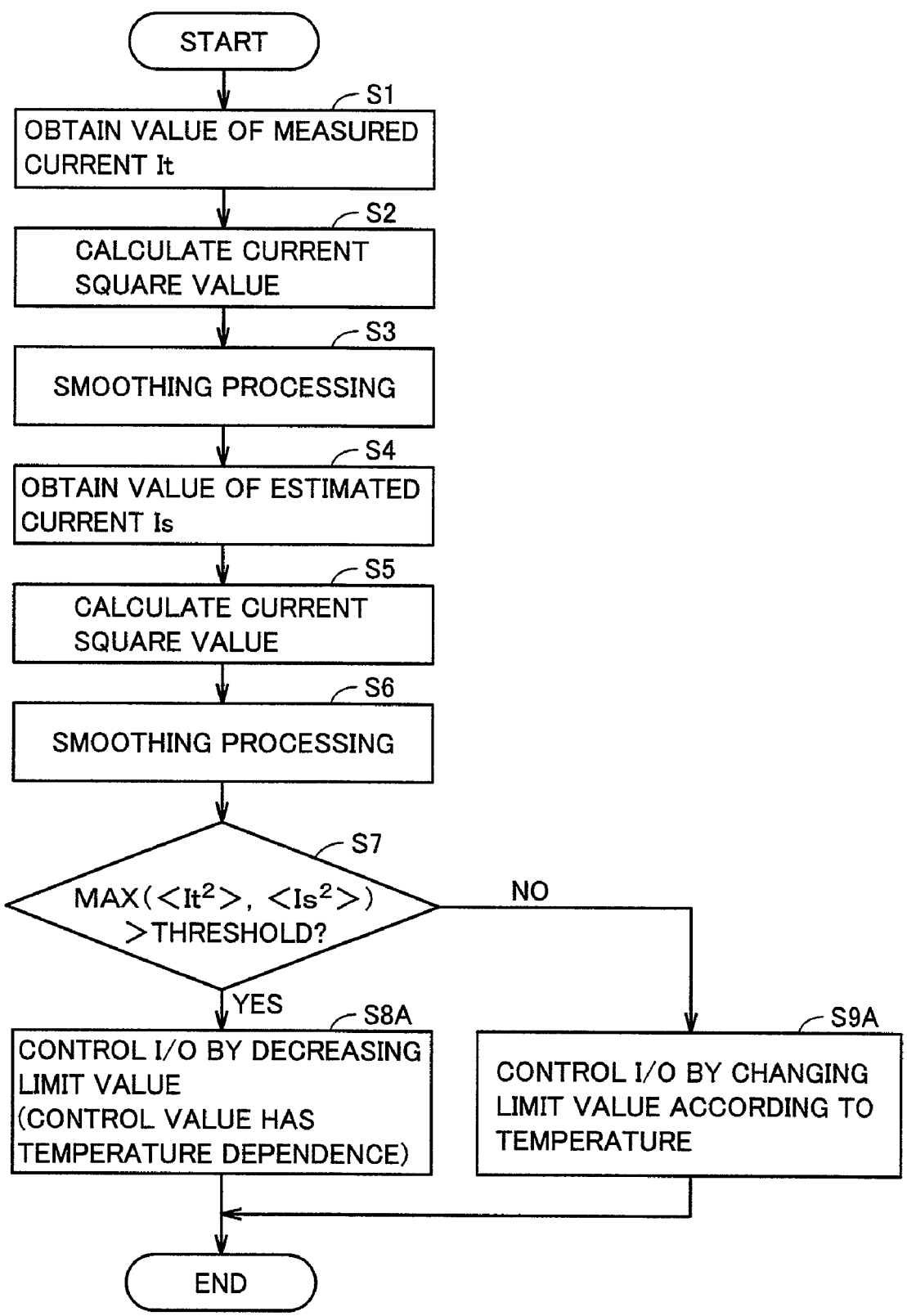
FIG. 18 is a flowchart showing the input/output limiting processing in the second embodiment.

FIG. 18 is a flowchart showing the input/output limiting processing in the second embodiment. Referring to FIGS. 18 and 10, the flowchart of FIG. 18 differs from that of FIG. 10 in that the processing in steps S8A and S9A is executed instead of the processing in steps S8 and S9. The processing in other steps in the flowchart shown in FIG. 18 is substantially the same as that in the corresponding steps in the flowchart show in FIG. 10. Accordingly, description will be given on the processing in steps S8A and S9A, and description of the processing in the other steps is not repeated.

Referring to FIGS. 18 and 3, When MAX($<It^2>$, $<Is^2>$) is larger than the threshold (YES in step S7), limit value determining unit 54 decreases the limit value (input limit value MWin or output limit value MWout). However, the limit value in this operation has temperature dependence, and changes according to the battery temperature. Signal producing unit 55 issues, based on the limit value, step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S8A).

When MAX($<It^2>$, $<Is^2>$) is equal to or smaller than the threshold (NO in step S7), limit value determining unit 54 changes the limit value according to the battery temperature. In this case, signal producing unit 55 issues step-up instruction PWU, step-down instruction PWD, signal CSDN, drive instructions PWMI1 and PWMI2, and regeneration instructions PWMC1 and PWMC2, and performs the input/output control so that the input/output power of battery B may not exceed the limit value (step S9A).

Figure 19:
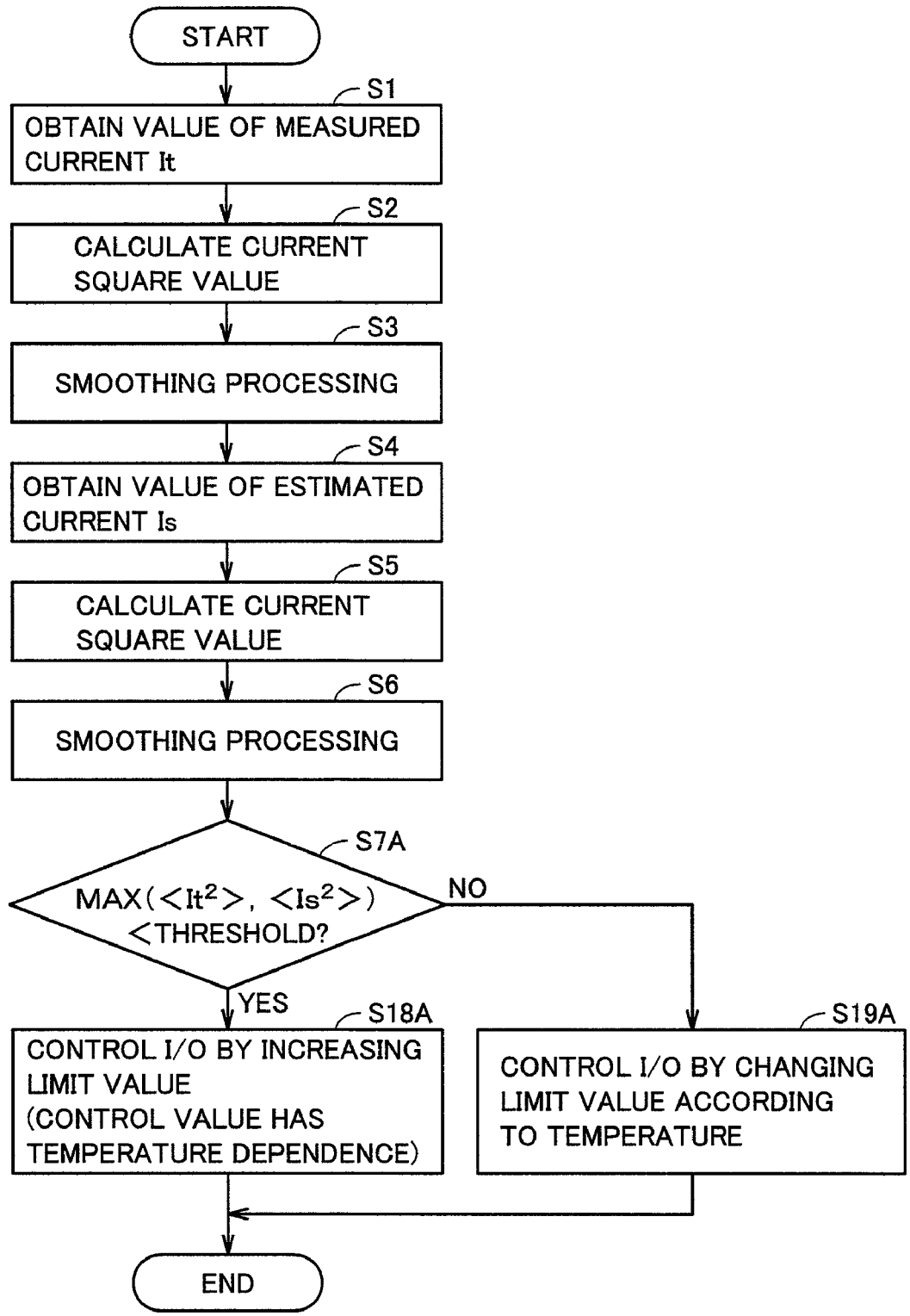
FIG. 19 is a flowchart showing the releasing processing in the second embodiment.

FIG. 19 is a flowchart showing the releasing processing in the second embodiment. Referring to FIGS. 19 and 15, the flowchart of FIG. 19 differs from that of FIG. 15 in that processing in steps S18A and S19A is executed instead of the processing in steps S18 and S19. The processing in the other steps in the flowchart shown in FIG. 19 is substantially the same as that in the corresponding steps in the flowchart shown in FIG. 15.

The processing in steps S18A and S19A is substantially the same as that in steps S8A and S9A shown in FIG. 18, and therefore description thereof is not repeated. In the case of YES in step S7A (i.e., when MAX($<It^2>$, $<Is^2>$) is larger than the threshold), the processing in steps S18A is executed. In the case of NO in step S7A (i.e., when MAX($<It^2>$, $<Is^2>$) is equal to or smaller than the threshold), the processing in steps S19A is executed.

According to the second embodiment, the limit value is set higher as the battery temperature rises so that the input/output power of the battery can be limited when the battery temperature is high. Accordingly, the second embodiment can suppress the rising of the battery temperature more effectively than the first embodiment.

[Third Embodiment]

Structures of a vehicle and an input/output control device of a secondary battery according to a third embodiment of the invention are substantially the same as those of the first embodiment, and therefore description thereof is not repeated.

Figure 20:
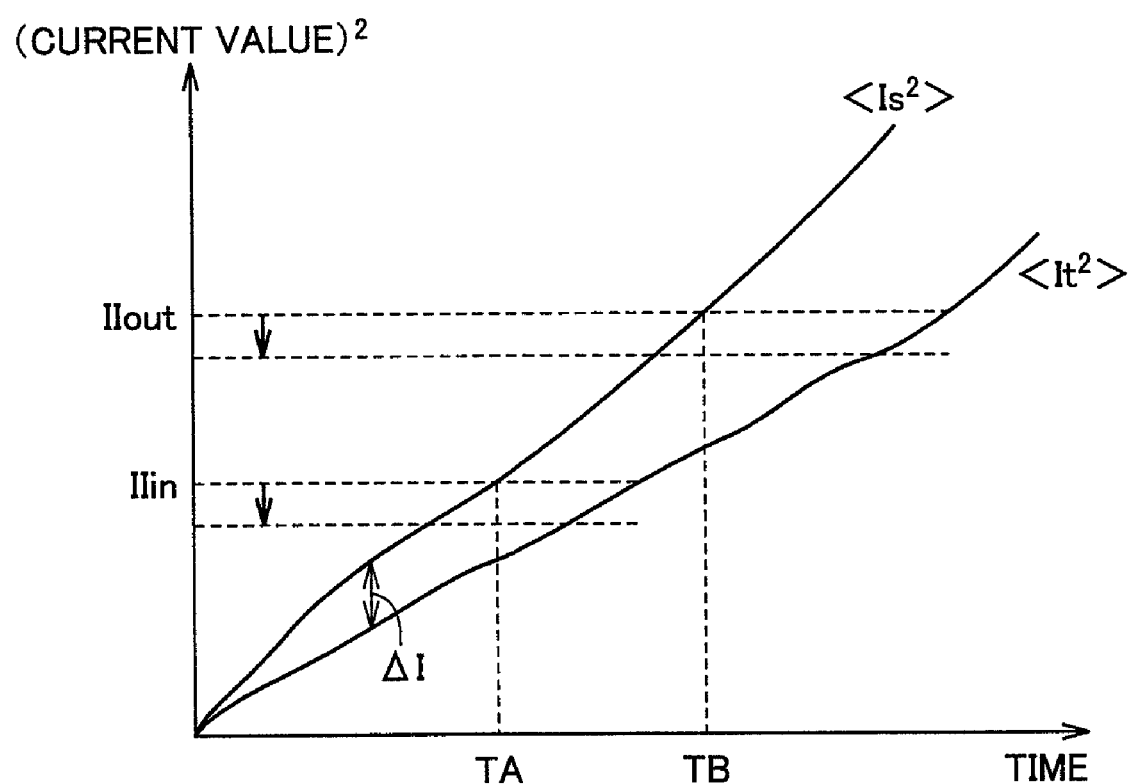
FIG. 20 illustrates the input/output limiting processing in a third embodiment.

FIG. 20 illustrates the input/output limiting processing in the third embodiment. Referring to FIG. 20, ΔI is a value obtained by subtracting a smaller one of current square values $<It^2>$ and $<Is^2>$ from larger one of them. In the third embodiment, when ΔI is larger than a predetermined value for a predetermined period, e.g., of several seconds, thresholds IIin and IIout are set lower than ordinary values, respectively.

For example, when a failure occurs in the current sensor, current square values $<It^2>$ and $<Is^2>$ may change while keeping a large difference between current square values $<It^2>$ and $<Is^2>$. In this case, it is expected to be difficult to determine appropriately the input/output limit value of the battery. Thus, the heating value of the battery may not be suppressed effectively.

In the third embodiment, when a large difference occurs between current square values $<It^2>$ and $<Is^2>$, the threshold is lowered. Thereby, the input/output power of the battery is further limited so that the significant increase in heating value of the battery can be suppressed. According to the third embodiment, therefore, even when the accuracy of measured current It or estimated current Is lowers due to a certain reason, it is possible to suppress the significant increase in heating value of the battery and the peripheral parts.

Figure 21:
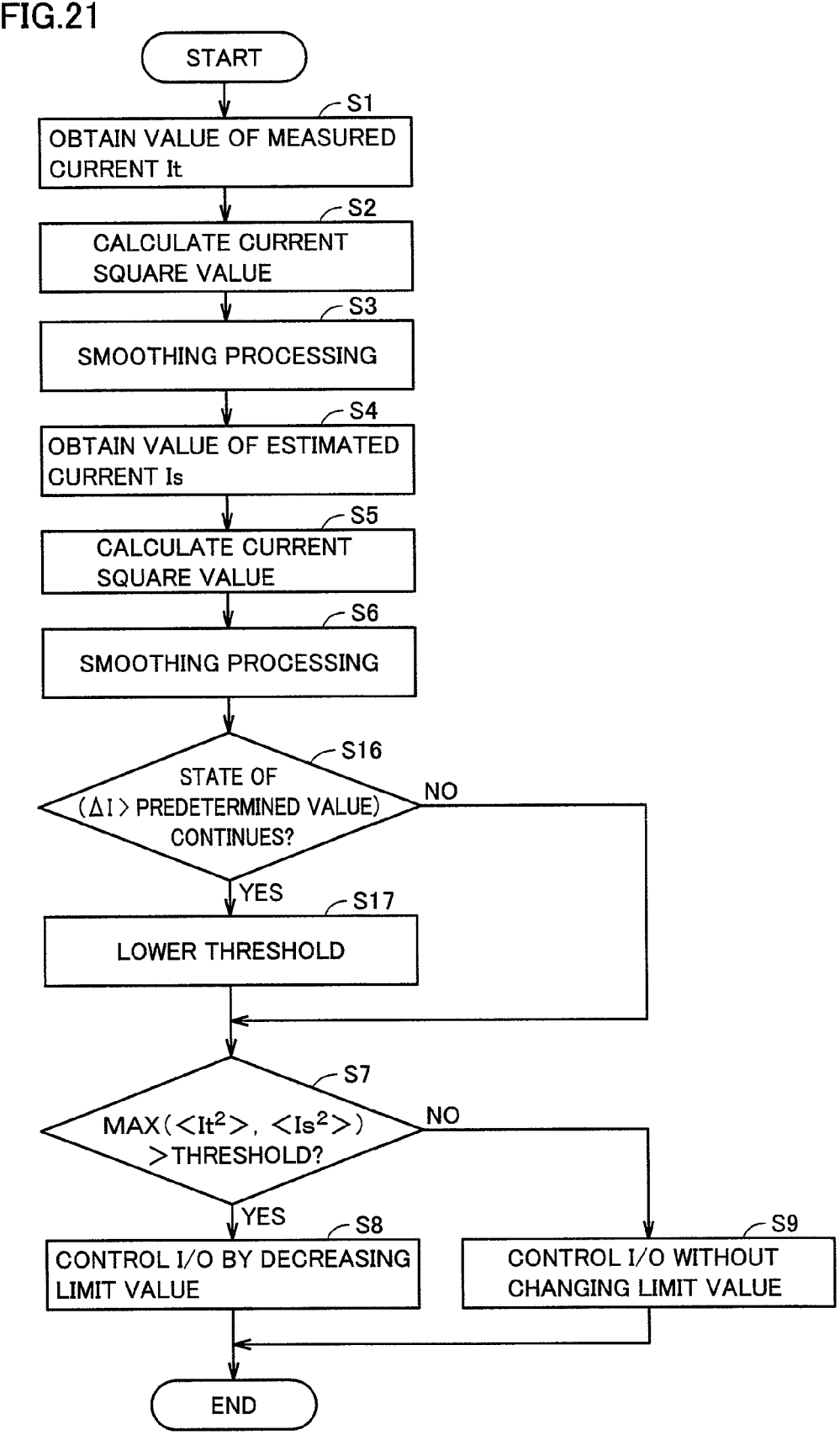
FIG. 21 is a flowchart showing input/output control processing in the third embodiment.

FIG. 21 is a flowchart showing the input/output control processing in the third embodiment. Referring to FIGS. 21 and 10, the flowchart shown in FIG. 21 differs from that in FIG. 10 in that processing in steps S16 and S17 is added between the processing in step S6 and the processing in step S7. The processing in the other steps in the flowchart shown in FIG. 21 is substantially the same as that in the corresponding steps in the flowchart shown in FIG. 10. Accordingly, the processing in steps S16 and S17 will be described below, and description of the processing in the other steps is not repeated.

Referring to FIGS. 21 and 3, after the processing in step S6, limit value determining unit 54 determines whether the state where ΔI (see FIG. 20) is larger than a predetermined value continues or not (step S16). When the state where ΔI is larger than the predetermined value continues for a predetermined period (YES in step S16), limit value determining unit 54 lowers thresholds IIin and IIout (step S17). When the processing in step S17 ends, the process proceeds to step S7.

When the result in step S16 is NO, i.e., when ΔI is smaller than the predetermined value, or when the state where ΔI is larger than the predetermined value continues for a period shorter than the predetermined period, the process proceeds to step S7. In this case, the threshold does not change.

Figure 22:
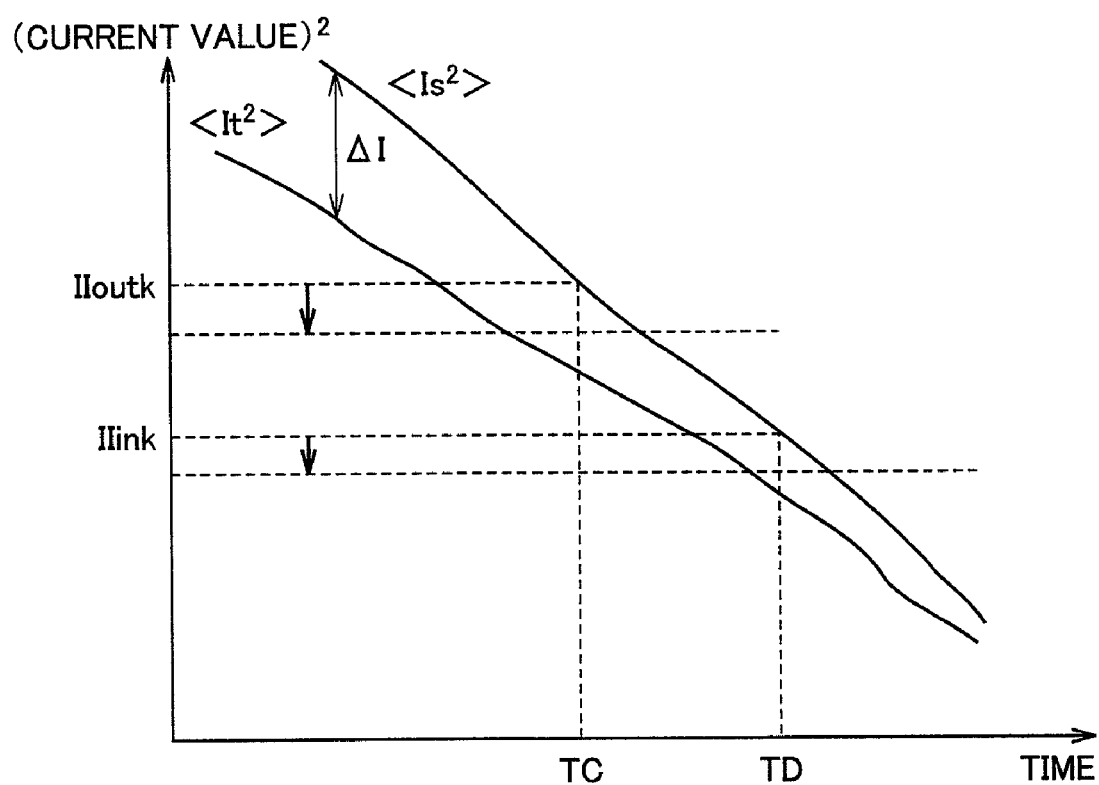
FIG. 22 illustrates the releasing processing in the third embodiment.

FIG. 22 illustrates the releasing processing in the third embodiment.

Referring to FIG. 22, when ΔI is larger than the predetermined value for a predetermined period in the releasing processing, thresholds IIink and IIoutk are set low.

Figure 23:
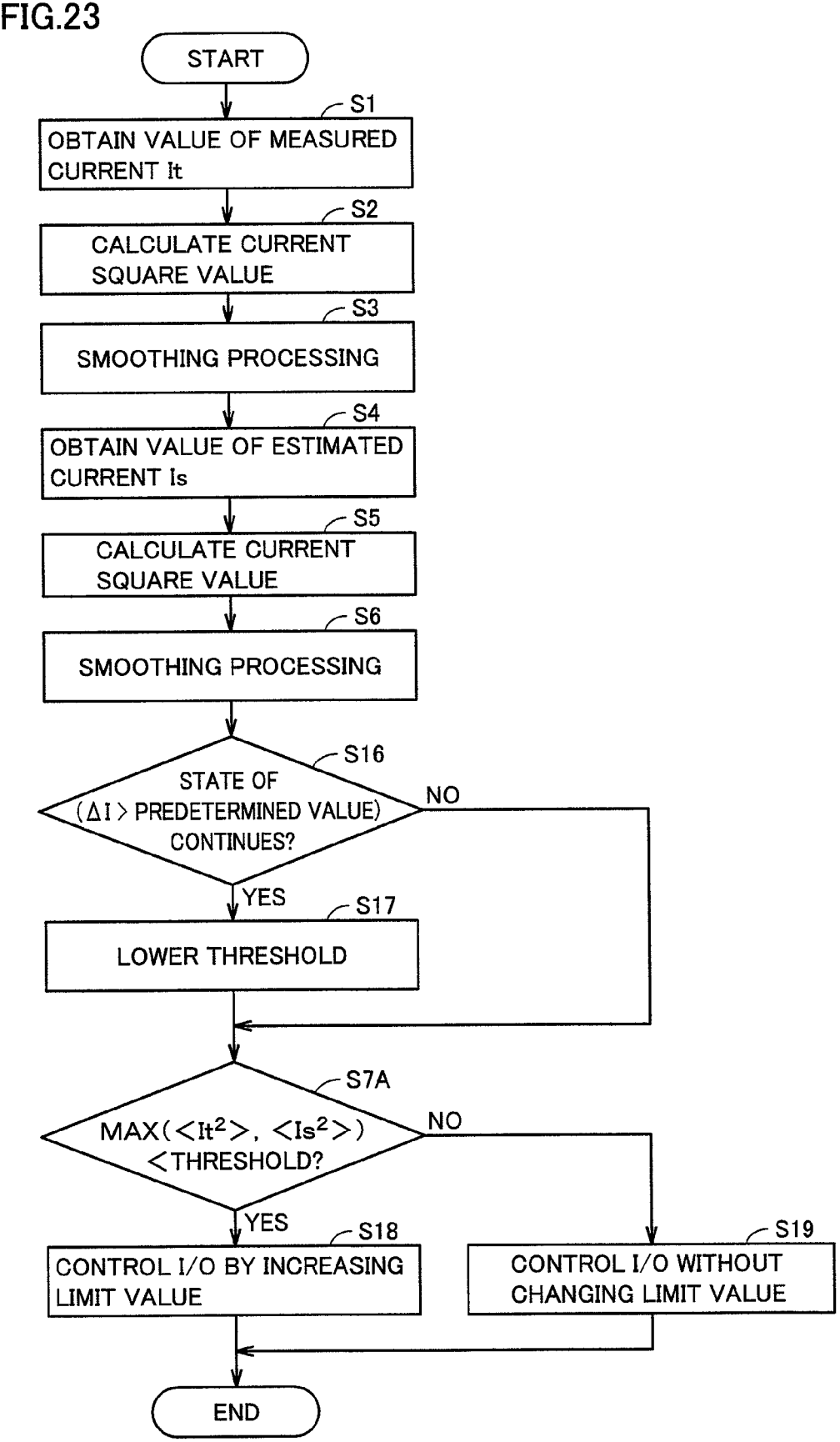
FIG. 23 is a flowchart showing the releasing processing in the third embodiment.

FIG. 23 is a flowchart showing the releasing processing in the third embodiment. Referring to FIGS. 23 and 15, the flowchart shown in FIG. 23 differs from that shown in FIG. 15 in that the processing in steps S16 and S17 is added between the processing in step S6 and the processing in step S7A. The processing in the other steps in the flowchart shown in FIG. 23 is substantially the same as that in the corresponding steps in the flowchart shown in FIG. 15, and therefore description thereof is not repeated.

The processing in steps S16 and S17 is substantially the same as that in steps S16 and S17 shown in FIG. 21, and therefore description thereof is not repeated.

As described above, the third embodiment can suppress significant increase in hearing value of the battery and its peripheral parts even when one of the two current square values is abnormal.

The embodiments have been described in connection with the example applied to the series/parallel-type hybrid system in which the power splitting mechanism splits the power of the engine into powers and transmitting them to the wheel shaft and the electric power generators, respectively. However, the invention may be applied to a series-type hybrid vehicle in which the engine is used only for driving the electric power generator, and only the motor using the electric power generated by the power generator generates the drive power of the wheel shaft. Also, the invention may be applied to an electric vehicle that runs using only an electric motor. Since these vehicles may be equipped with the secondary battery as the electric power source of the motor, the invention can be applied to these electric vehicles.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An input/output control device for a secondary battery, comprising:
    an estimating unit for estimating a battery current input to or output from said secondary battery based on an input/output power of said secondary battery to output an estimated value;
    a current measuring unit for measuring said battery current to output a measured value; and
    a control unit for controlling said input/output power based on said estimated value and said measured value, wherein
    said control unit calculates a first value which is a square of said estimated value and a second value which is a square of said measured value, and limits said input/output power when determined that a larger one of said first and second values exceeds a predetermined threshold, and
    said control unit determines which one of said first and second values is larger based on a time-based variation in said first value and a time-based variation in said second value.

2. An input/output control device for a secondary battery, comprising:
- an estimating unit for estimating a battery current input to or output from said secondary battery based on an input/output power of said secondary battery to output an estimated value;
- a current measuring unit for measuring said battery current to output a measured value; and
- a control unit for controlling said input/output power based on said estimated value and said measured value, wherein
- said control unit calculates a first value which is a square of said estimated value and a second value which is a square of said measured value, and limits said input/output power when determined that a larger one of said first and second values exceeds a predetermined threshold, and
- said control unit lowers said predetermined threshold when a difference between said first and second values is larger than a predetermined value for a predetermined period.

3. The input/output control device of the secondary battery according to claim 1, further comprising a temperature sensing unit for sensing a battery temperature of said secondary battery, wherein
- said control unit changes a limit value of said input/output power of said secondary battery based on said battery temperature.

4. The input/output control device of the secondary battery according to claim 2, further comprising a temperature sensing unit for sensing a battery temperature of said secondary battery, wherein
- said control unit changes a limit value of said input/output power of said secondary battery based on said battery temperature.

5. A vehicle comprising:
- a secondary battery;
- an estimating unit for estimating a battery current input to or output from said secondary battery based on an input/output power of said secondary battery to output an estimated value;
- a motor generator, the secondary battery storing electric power input into and output from the motor generator;
- a current measuring unit for measuring said battery current to output a measured value; and
- a control unit for controlling said input/output power based on said estimated value and said measured value, wherein
- said control unit calculates a first value which is a square of said estimated value and a second value which is a square of said measured value, and limits said input/output power when determined that a larger one of said first and second values exceeds a predetermined threshold, and
- said control unit determines which one of said first and second values is larger based on a time-based variation in said first value and a time-based variation in said second value.

6. A vehicle comprising:
- a secondary battery;
- an estimating unit for estimating a battery current input to or output from said secondary battery based on an input/output power of said secondary battery to output an estimated value;
- a motor generator, the secondary battery storing electric power input into and output from the motor generator;
- a current measuring unit for measuring said battery current to output a measured value; and
- a control unit for controlling said input/output power based on said estimated value and said measured value, wherein
- said control unit calculates a first value which is a square of said estimated value and a second value which is a square of said measured value, and limits said input/output power when determined that a larger one of said first and second values exceeds a predetermined threshold, and
- said control unit lowers said predetermined threshold when a difference between said first and second values is larger than a predetermined value for a predetermined period.

7. The vehicle according to claim 5, further comprising:
- a temperature sensing unit for sensing a battery temperature of said secondary battery, wherein
- said control unit changes a limit value of said input/output power of said secondary battery based on said battery temperature.

8. The vehicle according to claim 6, further comprising:
- a temperature sensing unit for sensing a battery temperature of said secondary battery, wherein
- said control unit changes a limit value of said input/output power of said secondary battery based on said battery temperature.

* * * * *